(12) United States Patent
Lee et al.

(10) Patent No.: US 11,886,656 B2
(45) Date of Patent: Jan. 30, 2024

(54) ELECTRONIC DEVICE AND CONTROL METHOD THEREFOR

(71) Applicant: HiDeep Inc., Seongnam-si (KR)

(72) Inventors: Hwanhee Lee, Seongnam-si (KR); Seyeob Kim, Seongnam-si (KR); Bonkee Kim, Seongnam-si (KR); Hyoungwook Woo, Seongnam-si (KR); Kiryoung Jung, Seongnam-si (KR); Wonwoo Lee, Seongnam-si (KR)

(73) Assignee: HIDEEP INC., Seongnam-si (KR)

( * ) Notice: Subject to any disclaimer, the term of this patent is extended or adjusted under 35 U.S.C. 154(b) by 170 days.

(21) Appl. No.: 17/600,628

(22) PCT Filed: Mar. 27, 2020

(86) PCT No.: PCT/KR2020/004166
§ 371 (c)(1),
(2) Date: Oct. 1, 2021

(87) PCT Pub. No.: WO2020/209534
PCT Pub. Date: Oct. 15, 2020

(65) Prior Publication Data
US 2022/0164081 A1 May 26, 2022

(30) Foreign Application Priority Data
Apr. 10, 2019 (KR) .................. 10-2019-0042053
Jan. 22, 2020 (KR) .................. 10-2020-0008828

(51) Int. Cl.
*G06F 3/041* (2006.01)
*G06F 3/044* (2006.01)
*G06F 3/0354* (2013.01)

(52) U.S. Cl.
CPC ...... *G06F 3/04162* (2019.05); *G06F 3/03545* (2013.01); *G06F 3/0412* (2013.01); *G06F 3/0442* (2019.05)

(58) Field of Classification Search
CPC ............ G06F 3/04162; G06F 3/03545; G06F 3/0412; G06F 3/0442; G06F 2203/04106;
(Continued)

(56) References Cited

U.S. PATENT DOCUMENTS 5,898,136 A * 4/1999 Katsurahira ............ G06F 3/046
345/173
9,552,095 B2 * 1/2017 Kim .................... G06F 3/04166
(Continued)

FOREIGN PATENT DOCUMENTS

| CN | 104571732 | 4/2015 |
| CN | 105739748 | 7/2016 |

(Continued)

OTHER PUBLICATIONS

KIPO, PCT Search Report & Written Opinion of PCT/KR2020/004166 dated Jul. 14, 2021.

*Primary Examiner* — Benyam Ketema
(74) *Attorney, Agent, or Firm* — LEX IP MEISTER, PLLC

(57) ABSTRACT

An embodiment of the present invention provides a display device including: a touch sensor configured to sequentially transfer an electromagnetic signal having two or more frequencies to a stylus pen, and to receive an electromagnetic signal corresponding to the electromagnetic signal from the stylus pen; and a touch controller configured to operate the touch sensor by determining one of the two or more frequencies as the frequency of the electromagnetic signal depending on a change in the received electromagnetic signal.

13 Claims, 28 Drawing Sheets

(58) Field of Classification Search
CPC ......... G06F 2203/04114; G06F 3/0383; G06F 3/046; G06F 3/0418; G06F 3/044; G06F 2203/0384; G06F 2203/04102; H02J 50/12
See application file for complete search history.

(56) References Cited

U.S. PATENT DOCUMENTS

| | | | | |
|---|---|---|---|---|
| 11,481,047 | B2* | 10/2022 | Jung | G06F 3/03545 |
| 11,573,664 | B1* | 2/2023 | Slassi | G06F 3/0441 |
| 11,609,653 | B2* | 3/2023 | Kim | G06F 3/04166 |
| 2007/0165007 | A1* | 7/2007 | Morrison | G06F 3/0428 |
| | | | | 345/175 |
| 2007/0200487 | A1* | 8/2007 | Uno | G06F 3/046 |
| | | | | 313/500 |
| 2009/0079710 | A1* | 3/2009 | Lapstun | B42C 19/02 |
| | | | | 345/179 |
| 2009/0184939 | A1* | 7/2009 | Wohlstadter | G06F 3/04845 |
| | | | | 345/173 |
| 2011/0122087 | A1* | 5/2011 | Jang | G06F 3/0446 |
| | | | | 345/174 |
| 2012/0262407 | A1* | 10/2012 | Hinckley | G06F 3/04883 |
| | | | | 345/173 |
| 2012/0262411 | A1* | 10/2012 | Ahn | G06F 3/0442 |
| | | | | 345/204 |
| 2014/0028577 | A1* | 1/2014 | Krah | G06F 3/0446 |
| | | | | 345/173 |
| 2014/0085259 | A1* | 3/2014 | Lee | G06F 3/04883 |
| | | | | 345/174 |
| 2014/0226901 | A1* | 8/2014 | Spracklen | H04N 19/117 |
| | | | | 382/167 |
| 2014/0362012 | A1* | 12/2014 | Lee | G06F 3/046 |
| | | | | 345/173 |
| 2015/0103039 | A1* | 4/2015 | Cho | G06F 3/03545 |
| | | | | 345/174 |
| 2015/0253968 | A1* | 9/2015 | Joo | G06F 3/04845 |
| | | | | 715/798 |
| 2015/0293627 | A1* | 10/2015 | Park | G06F 3/0488 |
| | | | | 345/174 |
| 2015/0338968 | A1* | 11/2015 | Yao | G06F 3/0383 |
| | | | | 345/174 |
| 2016/0209957 | A1* | 7/2016 | Jung | G06F 3/017 |
| 2016/0224177 | A1* | 8/2016 | Krah | G06F 3/044 |
| 2016/0275275 | A1* | 9/2016 | Wang | H04M 1/67 |
| 2018/0024653 | A1* | 1/2018 | Attarian | G06F 3/0383 |
| | | | | 345/179 |
| 2018/0217685 | A1* | 8/2018 | Xi | G06F 3/0442 |
| 2018/0329563 | A1* | 11/2018 | Han | G06F 3/04162 |
| 2019/0278893 | A1* | 9/2019 | Eisen | G06F 21/36 |
| 2020/0050315 | A1* | 2/2020 | Han | G06F 3/0441 |
| 2020/0050350 | A1* | 2/2020 | Lee | G06F 3/04883 |
| 2020/0053196 | A1* | 2/2020 | Park | H04M 1/724 |
| 2020/0333915 | A1* | 10/2020 | Li | G06F 3/04883 |
| 2020/0336584 | A1* | 10/2020 | Park | G06F 3/04162 |
| 2021/0004113 | A1* | 1/2021 | Autio | G06F 3/0414 |
| 2021/0022622 | A1* | 1/2021 | Lee | A61B 5/02427 |
| 2021/0286463 | A1* | 9/2021 | Chang | G06F 3/0418 |
| 2021/0349619 | A1* | 11/2021 | Crowley | G06F 3/0482 |
| 2022/0244806 | A1* | 8/2022 | Kim | G06F 3/046 |
| 2023/0143141 | A1* | 5/2023 | Choi | G06F 3/04182 |
| | | | | 345/174 |

FOREIGN PATENT DOCUMENTS

| | | |
|---|---|---|
| CN | 109074177 | 12/2018 |
| KR | 10-2015-0129960 | 11/2015 |
| KR | 10-2016-0019989 | 2/2016 |
| KR | 10-2017-0060469 | 6/2017 |
| KR | 10-2017-0101478 | 9/2017 |

* cited by examiner

ELECTRONIC DEVICE AND CONTROL METHOD THEREFOR

TECHNICAL FIELD

The present disclosure relates to an electronic device and a control method thereof.

BACKGROUND ART

Various electronic devices such as mobile phones, smart phones, tablet PCs, laptop computers, digital broadcasting terminals, PDAs (personal digital assistants), PMPs (portable multimedia players), and navigation devices include touch sensors.

In such an electronic device, a touch sensor may be disposed on a display panel displaying an image, or may be disposed in an area of a body of the electronic device. As a user interacts with the electronic device by touching the touch sensor, the electronic device may provide the user with an intuitive user interface.

The user may use a stylus pen for sophisticated touch input. The stylus pen may be classified into an active stylus pen and a passive stylus pen depending on whether a battery and an electronic component are provided therein.

The active stylus pen has superior basic performance compared to the passive stylus pen and has an advantage of providing additional functions (pen pressure, hovering, and button), but has a disadvantage in that it is difficult to use while charging the battery.

The passive stylus pen is inexpensive and requires no battery compared to the active stylus pen, but has difficult touch recognition as compared to the active stylus pen. However, recently, a technique for implementing a passive stylus pen capable of sophisticated touch recognition using a resonance circuit has been proposed.

The above information disclosed in this Background section is only for enhancement of understanding of the background of the invention, and therefore, it may contain information that does not form the prior art that is already known in this country to a person of ordinary skill in the art.

DISCLOSURE

Technical Problem

Embodiments have been made in an effort to provide an electronic device for detecting a resonance frequency of a stylus pen and a control method thereof.

Embodiments have been made in an effort to provide an electronic device for outputting a driving signal corresponding to a resonance frequency of a stylus pen, and a control method thereof.

Technical Solution

For achieving the objects or other objects, an embodiment of the present invention provides an electronic device including: a touch sensor configured to sequentially transfer an electromagnetic signal having two or more frequencies to a stylus pen, and to receive the electromagnetic signal corresponding to the electromagnetic signal from the stylus pen; and a touch controller configured to operate the touch sensor by determining one of the two or more frequencies as the frequency of the electromagnetic signal depending on a change in the received electromagnetic signal.

The touch controller may determine a frequency at which a magnitude of the received electromagnetic signal is large as the frequency of the electromagnetic signal.

The touch controller may generate touch data based on the received electromagnetic signal in units of one frame.

The touch sensor may sequentially apply the electromagnetic signal having the two or more frequencies within the one frame.

The touch sensor may apply electromagnetic signals of different frequencies corresponding to a plurality of time periods within the one frame during each time period.

The touch sensor may sequentially apply the electromagnetic signal having the two or more frequencies in units of the one frame.

The touch sensor may sequentially apply electromagnetic signals each having a frequency included in each of a plurality of first frequency sections divided by a first frequency unit during each of a plurality of time periods within a first frame, and sequentially applies electromagnetic signals each having a frequency included in each of a plurality of second frequency sections divided by a second frequency unit to each of a plurality of time periods within a second frame that is successive to the first frame, and the first frequency unit may be greater than the second frequency unit.

A first frequency section including a frequency having a largest magnitude among electromagnetic signals received during a first frame may be divided in the second frequency unit.

The touch sensor may include: a touch panel configured to include a plurality of first touch electrodes for detecting touch coordinates in a first direction and a plurality of second touch electrodes for detecting touch coordinates in a second direction crossing the first direction; and a driver/receiver configured to apply driving signals corresponding to the two or more frequencies to at least one of the first touch electrodes and the second touch electrodes to allow the electromagnetic signal having the two or more frequencies to be transferred to the stylus pen, and to receive the electromagnetic signal from the stylus pen.

The touch sensor may include: a touch panel configured to include a loop coil for generating a magnetic field, a touch panel configured to include a plurality of first touch electrodes for detecting touch coordinates in a first direction, and a plurality of second touch electrodes for detecting touch coordinates in a second direction crossing the first direction; and a driver/receiver configured to apply driving signals corresponding to the two or more frequencies to the loop coil to allow the electromagnetic signal having the two or more frequencies to be transferred to the stylus pen, and to receive the electromagnetic signal from the stylus pen.

The electronic device may further include a temperature sensor configured to sense an ambient temperature, and the touch sensor may start transmitting the electromagnetic signal having the two or more frequencies when the ambient temperature is changed.

An embodiment of the present invention provides a control method of an electronic device, including: sequentially transmitting, by the touch sensor, an electromagnetic signal having two or more frequencies to a stylus pen; and determining, by a touch controller, one of the two or more frequencies as the frequency of the electromagnetic signal depending on a change in the received electromagnetic signal to operate the touch sensor.

The determining of one of the two or more frequencies as the frequency of the electromagnetic signal may include determining, by the touch controller, a frequency at which a magnitude of the received electromagnetic signal is large as the frequency of the electromagnetic signal.

The control method may further include generating, by the touch controller, touch data based on the received electromagnetic signal in units of one frame.

The sequentially transmitting of the electromagnetic signal having the two or more frequencies to the stylus pen may include sequentially applying, by the touch sensor, the electromagnetic signal having the two or more frequencies within the one frame.

The sequentially transmitting of the electromagnetic signal having the two or more frequencies to the stylus pen may include sequentially applying, by the touch sensor, the electromagnetic signal having the two or more frequencies in units of the one frame.

The sequentially applying of the electromagnetic signal having two or more frequencies in units of the one frame may include: sequentially applying, by the touch sensor, electromagnetic signals each having a frequency included in each of a plurality of first frequency sections divided by a first frequency unit during each of a plurality of time periods within a first frame; and sequentially applying, by the touch sensor, electromagnetic signals each having a frequency included in each of a plurality of second frequency sections divided by a second frequency unit to each of a plurality of time periods within a second frame that is successive to the first frame, and the first frequency unit may be greater than the second frequency unit.

A first frequency section including a frequency having a largest magnitude among electromagnetic signals received during the first frame may be divided in the second frequency unit.

The control method may further include sensing an ambient temperature, and transmitting of the electromagnetic signal having two or more frequencies may be started when the ambient temperature is changed.

An embodiment of the present invention provides a system including: a stylus pen configured to include a resonance circuit having a resonance frequency; and a touch sensor configured to search for the resonance frequency by increasing a frequency of a driving signal from a lower limit to an upper limit within a predetermined range of a reference frequency or decreasing the frequency of the driving signal from the upper limit to the lower limit within the predetermined range, and to transfer an electromagnetic signal having the resonance frequency to the stylus pen.

Advantageous Effects

According to the embodiments, even when a resonance frequency of a stylus pen is changed, it is possible to increase a magnitude of a signal that is outputted from the stylus pen.

According to the embodiments, it is possible to improve reception sensitivity of the touch input.

According to the embodiments, it is possible to accurately calculate touch positions.

MODE FOR INVENTION

Figure 1:
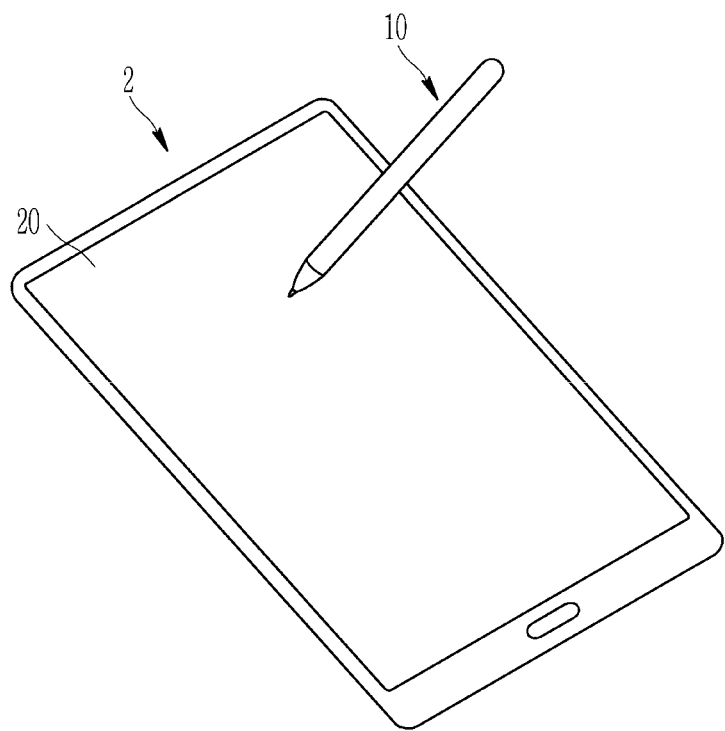
FIG. 1 illustrates a schematic view showing a stylus pen and an electronic device.

The present invention will be described more fully hereinafter with reference to the accompanying drawings, in which embodiments of the invention are shown. As those skilled in the art would realize, the described embodiments may be modified in various different ways, all without departing from the spirit or scope of the present invention.

To clearly describe the present invention, parts that are irrelevant to the description are omitted, and like numerals refer to like or similar constituent elements throughout the specification.

Further, since sizes and thicknesses of constituent members shown in the accompanying drawings are arbitrarily given for better understanding and ease of description, the present invention is not limited to the illustrated sizes and thicknesses. In the drawings, the thicknesses of layers, films, panels, regions, etc., are exaggerated for clarity. In the drawings, for better understanding and ease of description, the thicknesses of some layers and areas are exaggerated.

It will be understood that when an element such as a layer, film, region, or substrate is referred to as being "on" another element, it can be directly on the other element or intervening elements may also be present. In contrast, when an element is referred to as being "directly on" another element, there are no intervening elements present. Further, in the specification, the word "on" or "above" means positioned on or below the object portion, and does not necessarily mean positioned on the upper side of the object portion based on a gravitational direction.

In addition, unless explicitly described to the contrary, the word "comprise" and variations such as "comprises" or "comprising" will be understood to imply the inclusion of stated elements but not the exclusion of any other elements.

Hereinafter, an electronic device and a driving method thereof according to embodiments will be described with reference to necessary drawings.

In the case of an active stylus pen, an amplitude of a resonance signal in a resonance circuit built into the stylus pen must be large in order to efficiently transfer power to the battery in a wireless charging method. Meanwhile, in the resonance method of the passive stylus pen, the amplitude of the resonance signal in the resonance circuit built into the stylus pen must be large in order for the touch sensor to more accurately identify a touch by the stylus pen.

Accordingly, it is very important to transmit a signal having a same frequency as the resonance frequency of the resonance circuit of the stylus pen to the stylus pen to create a maximum resonance signal.

Figure 2:
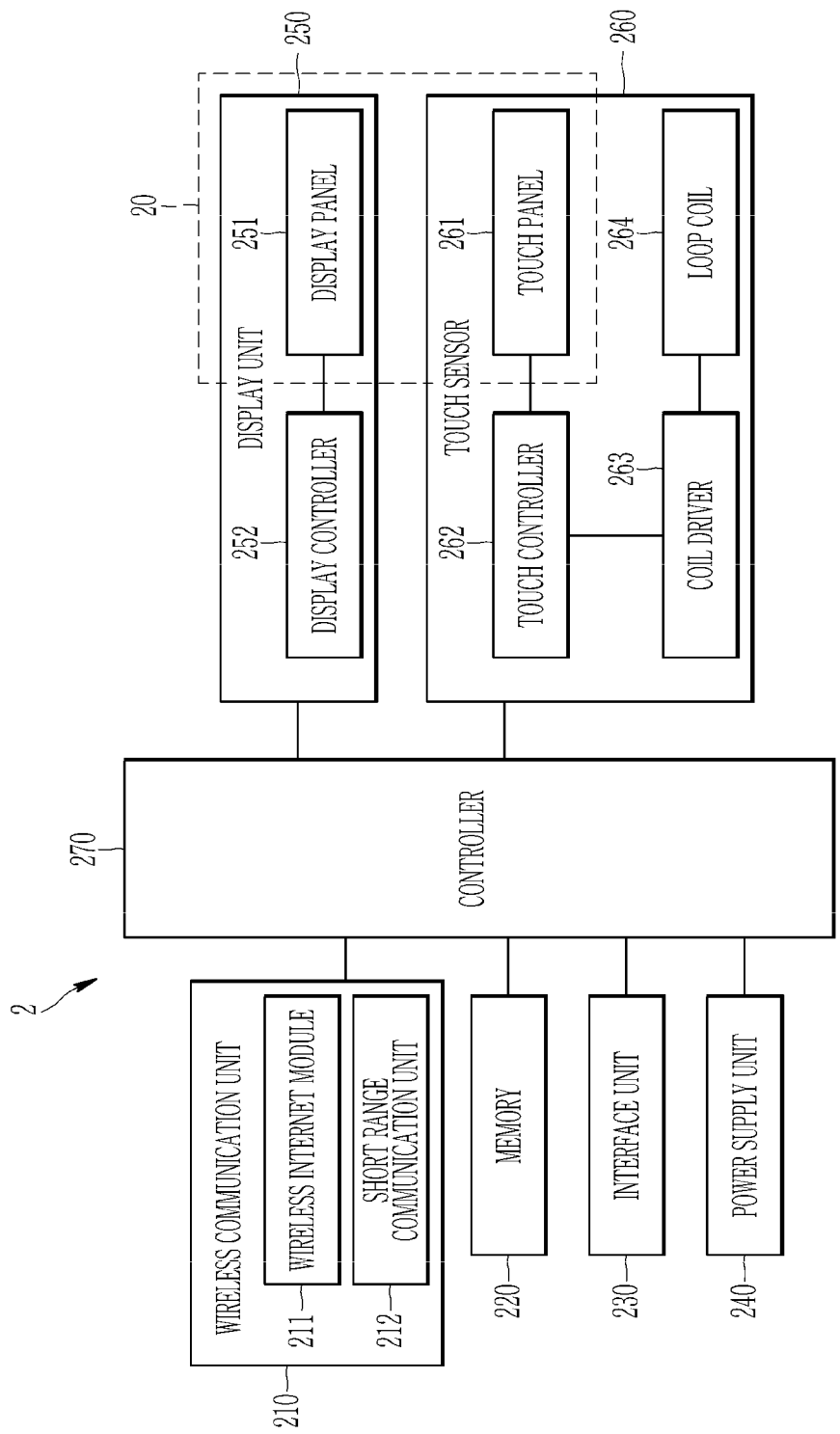
FIG. 2 illustrates a block diagram schematically showing an electronic device.

FIG. 1 illustrates a schematic view showing a stylus pen and an electronic device, FIG. 2 illustrates a block diagram schematically showing an electronic device, and FIG. 3 illustrates a stylus pen according to an embodiment.

As illustrated in FIG. 1, a stylus pen 10 may receive a signal output from an electronic device 20 near a touch screen 20 of the electronic device 2, or the touch screen 20, and may transmit the signal to the touch screen 20.

The electronic device 2 may include at least one of a portable communication device (e.g., a smartphone or a tablet PC), a computer device, a portable multimedia device, a portable medical device, a wearable device, and a consumer electronic device. In addition, the electronic device 2 may be a flexible device or a flexible display device.

The electronic device 2 may include a wireless communication unit 210, a memory 220, an interface unit 230, a power supply unit 240, a display unit 250, a touch sensor 260, a controller 270, and the like. The constituent elements illustrated in FIG. 1 are not essential for implementing an electronic device, so the electronic device described in the present disclosure may include more or less constituent elements than the foregoing listed constituent elements.

Specifically, among the constituent elements, the wireless communication unit 210 may include at least one module that enables wireless communication between the electronic device 2 and a wireless communication system, between the terminal 2 and another electronic device 2, or between the electronic device 2 and an external server. In addition, the wireless communication unit 210 may include at least one module for connecting the electronic device 2 to at least one network.

The wireless communication unit 210 may include a wireless Internet module 211 and a short range communication module 212.

The wireless Internet module 211 refers to a module for wireless Internet connection, and may be embedded in the electronic device 2. The wireless Internet module 211 is configured to transmit and receive wireless signals in a communication network according to wireless Internet technologies. The wireless Internet module 211 transceives a wireless signal in a communication network according to the wireless Internet technologies. Examples of the wireless Internet technology include a Wireless Local Area Network (WLAN), Wireless Fidelity (Wi-Fi), Wi-Fi Direct, Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), Long Term Evolution (LTE), and Long Term Evolution-Advanced (LTE-A), and the wireless Internet module 171 transceives data according to at least one wireless Internet technology in a range including Internet technology which is not listed above.

The short range communication module 212 is for short range communication, and may support short range communication by using at least one of Bluetooth™, Radio Frequency Identification (RFID), Infrared Data Association (IrDA), Ultra Wideband (UWB), ZigBee, Near Field Communication (NFC), Wi-Fi, Wi-Fi direct, and Wireless Universal Serial Bus (USB) technologies. The short range communication module 212 may support wireless communication between the electronic device 2 and the wireless communication system, the electronic device 2 and a device capable of wireless communication, or the touch sensor 2 and a network, in which an external server is located, through a wireless area network. The wireless area network may be a wireless personal area network.

Herein, the device capable of wireless communication may be a mobile terminal capable of exchanging (or interworking) data with the electronic device 2 according to the present invention, e.g., a smart phone, a tablet PC, a notebook computer, etc. The short range communication module 212 may detect (or recognize) a device capable of wireless communication which is capable of communicating with the electronic device 2, around the electronic device 2. Further, when the detected device capable of wireless communication is a device authenticated to communicate with the electronic device 2 according to the embodiment, the controller 170 may transmit at least some of data processed by the electronic device 2 to the device capable of wireless communication through the short-range communication module 212. Accordingly, a user of the device capable of wireless communication may use data processed in the electronic device 2 through the device capable of wireless communication.

In addition, the memory 220 stores data supporting various functions of the electronic device 2. The memory 220 may store a plurality of application programs (or applications), data for operating the electronic device 2, and commands, which are driven in the electronic device 2.

The interface unit 230 serves as a passage of various kinds of external devices connected to the electronic device 2. The interface unit 230 may include at least one of a wired/wireless headset port, an external charger port, a wired/wireless data port, a memory card port, a port for connection with a device equipped with an identification module, an audio input/output (I/O) port, a video input/output (I/O) port, and an earphone port.

The power supply unit 240 receives power from an external power source and an internal power source, and supplies the power from the power source to each constituent element included in the electronic device 2 under the control of the control unit 270. The power supply unit 240 includes a battery, and the battery may be an embedded battery or a replaceable battery.

The display unit 250 displays (outputs) information processed by the electronic device 2. For example, the display unit 250 may display execution image information of an application program driven in the electronic device 2, or user interface (UI) and graphical user interface (GUI) information according to the execution image information.

The display unit 250 may include a liquid crystal display (LCD), an organic light emitting diode (OLED) display, an e-ink display, and the like.

The display unit 250 includes a display panel 251 for displaying an image, and a display controller 252 connected to the display panel 251 to supply signals for displaying an image to the display panel 251. For example, the display panel 251 may include a plurality of pixels connected to signal lines such as a plurality of scan lines and a plurality of data lines, and a scan driver for supplying a scan signal to the scan lines, and the display controller 252 may include a data driver IC for generating a data signal applied to a data line, a timing controller for controlling an overall operation of the display unit 250 by processing an image signal, and a power management IC.

The touch sensor 260 senses a touch (or touch input) applied to a touch area by using a capacitive method. As an example, the touch sensor 260 may be configured to convert a change in capacitance, voltage, current, or the like, which are generated in a specific portion, into an electrical input signal. The touch sensor 260 may be configured to detect a position, an area, a capacitance at the touch, and the like, when a touch object that applies a touch onto a touch area is touched on the touch sensor 260. Herein, the touch object indicates an object applying a touch to the touch sensor, and may be, e.g., a body part of a user (finger, palm, etc.), a passive or active stylus pen 10, or the like.

The touch sensor 260 includes a touch panel 261 in which a touch electrode is positioned, and a touch controller 262 configured to transfer touch data to the controller 270 and/or the display controller 252 by applying a driving signal to the touch panel 261 and receiving a detection signal from the touch panel 261.

The touch controller 262 may output touch coordinate information in response to a touch input detected by the touch panel 261. In addition, the touch controller 262 may change a frequency of the driving signal in response to a touch detection result thereof.

In an embodiment, the touch controller 262 may include: a driver connected to at least one of a plurality of first touch electrodes and a plurality of second touch electrodes to apply a driving signal; a receiver connected to at least one of the first touch electrodes and the second touch electrodes to receive a sensing signal; and a microcontrol unit (MCU) configured to control operations of the driver and the receiver and to acquire a touch position by using a detection signal that is outputted from the receiver.

In another embodiment, the touch controller 262 may include: a first driver/receiver connected to the first touch electrodes to apply a driving signal and to receive a sensing signal; a second driver/receiver connected to the second touch electrodes to apply a driving signal and to receive a sensing signal; and an MCU configured to control operations of the driver/receivers and to acquire a touch position by using a detection signal outputted therefrom. The display panel 251 and the touch panel 261 may be referred to as a touch screen 20 by forming a mutual layer structure or being integrally formed.

The touch sensor 260 according to an embodiment may further include a loop coil 264 and a coil driver 263 for applying a driving signal to the loop coil 264. The loop coil 264 may be positioned around the touch screen 20, or may be positioned at any position in the electronic device 2. The loop coil 264 may also be configured as an antenna of the short-distance communication module 212 such as RFID or NFC. The drive signal includes an alternating current or alternating voltage having a predetermined frequency.

The controller 270 controls the driving of the electronic device 2, and typically controls a general operation of the electronic device 2 in addition to the operation related to the application program. The controller 270 processes the input or output signal, data, information, and the like, or drives the application program stored in the memory 270 through the foregoing constituent elements, thereby providing the user with or processing the appropriate information or function.

Further, the controller 270 may control at least a part of the constituent elements described with reference to FIG. 2 in order to drive the application program stored in the memory 220. Further, the controller 270 may combine two or more of the constituent elements included in the distance measuring apparatus 2 and operate the combined constituent elements for driving the application program.

FIG. 3 illustrates a stylus pen according to an embodiment. Stylus pens 10*a* and 10*b* each include a conductive tip 11 and a resonance circuit 12. At least a portion of the conductive tip 11 may be formed of a conductive material (e.g., a metal, conductive rubber, a conductive fabric, a conductive silicone, etc.), but the present invention is not limited thereto.

The resonance circuit 12, which is an LC resonance circuit, may resonate with a driving signal outputted from the loop coil 264. The driving signal may include a signal (e.g., a sine wave, a square wave, etc.) having a frequency corresponding to a resonance frequency of the resonance circuit 12. Resonance frequencies of the stylus pens 10*a* and 10*b* depend on design values of the resonance circuits 12 of the stylus pens 10*a* and 10*b*. For resonance, a resonance frequency of the resonance circuit 12 and a frequency of the driving signal must be the same or very similar. When the loop coil 264 generates a magnetic field by the driving signal or the touch panel 261 generates an electric field by the driving signal, the resonance circuits 12 of the stylus pens 10*a* and 10*b* resonate using signals received through a change in a magnetic field and/or an electric field.

Elements of each of the stylus pens 10*a* and 10*b* may be accommodated in a housing. The housing may have a cylindrical shape, a polygonal shape, a column shape having at least part of a shape of a curved surface, an entasis, a frustum of a pyramid, a circular truncated cone, or the like, but it is not limited thereto. Since an inside of the housing is empty, the elements of each of the stylus pens 10*a* and 10*b* such as the conductive tip 11 and the resonance circuit 12 may be accommodated therein. The housing may be made of a non-conductive material.

Figure 3A:
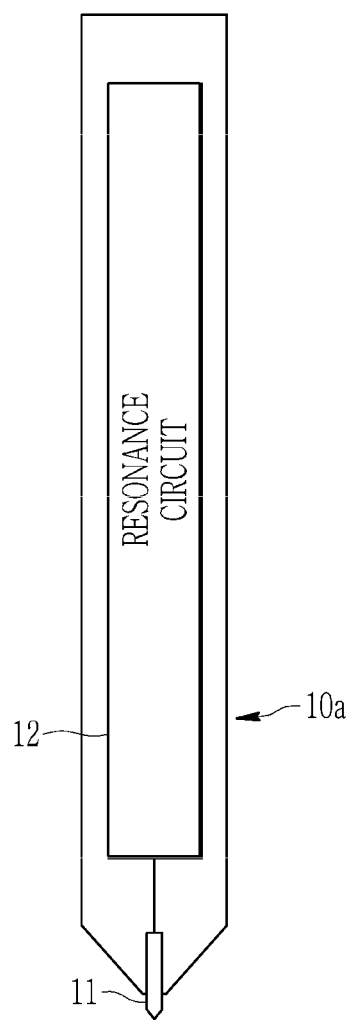
FIG. 3 illustrates a stylus pen according to an embodiment.

The stylus pen 10*a* illustrated in FIG. 3A may include a conductive tip 11 and a resonance circuit 12 directly connected to the conductive tip 11. The resonance circuit 12 resonates using energy transferred from the loop coil 264, and the resonated energy is directly outputted through the conductive tip 11.

The resonance signal caused by the resonance may be outputted to the touch screen 20 through the conductive tip 11 during the period in which the driving signal is inputted into the loop coil 264 and a period thereafter. The resonance circuit 12 is positioned in the housing, and is electrically connected to a ground.

Figure 3B:
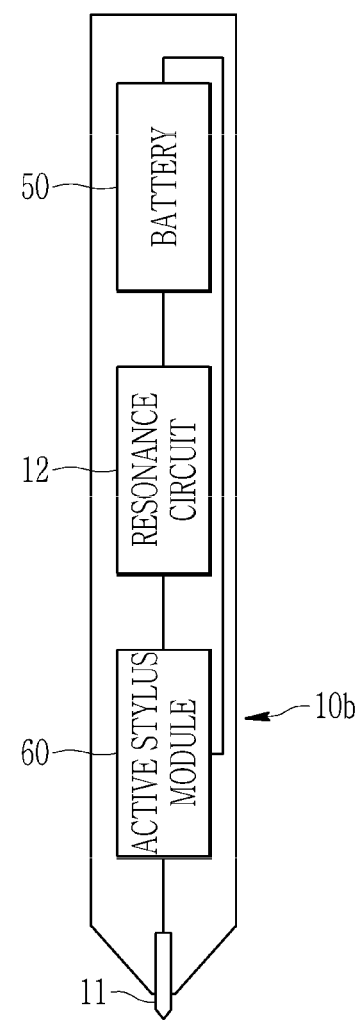

The stylus pen 10*b* illustrated in FIG. 3B includes the conductive tip 11, the resonance circuit 12, a battery 50 connected to the resonance circuit 12 to store power, and an active stylus module 60 connected to the conductive tip 11.

The resonance circuit 12 resonates using energy transferred from the loop coil 264, and the resonated energy is directly outputted through the conductive tip 11. The active stylus module 60 may receive power from the battery 50 and transfer a signal to the touch screen 20. The active stylus module 60 may include an oscillator and the like, and may transfer an electromagnetic signal) oscillating at a predetermined frequency generated by the oscillator to the touch screen 20.

Hereinafter, the touch sensor 260 and the electronic device 2 including the same according to an embodiment will be described with reference to FIG. 4 to FIG. 22.

Figure 4:
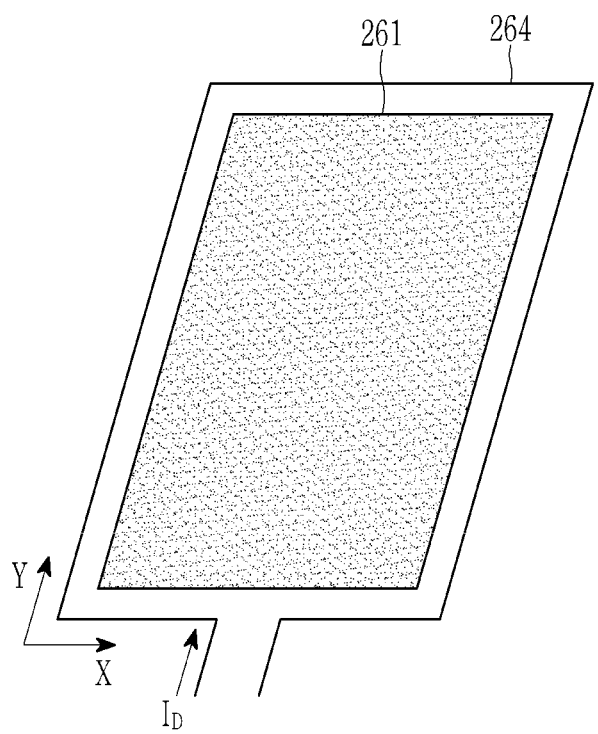
FIG. 4 to FIG. 6 each illustrate a disposal form of a touch panel and a loop coil.
Figure 5:
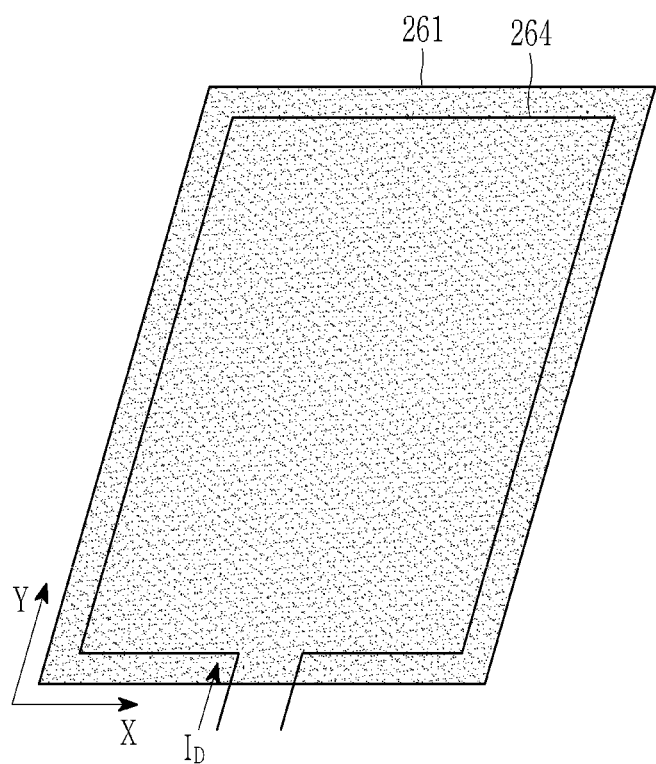
Figure 6:
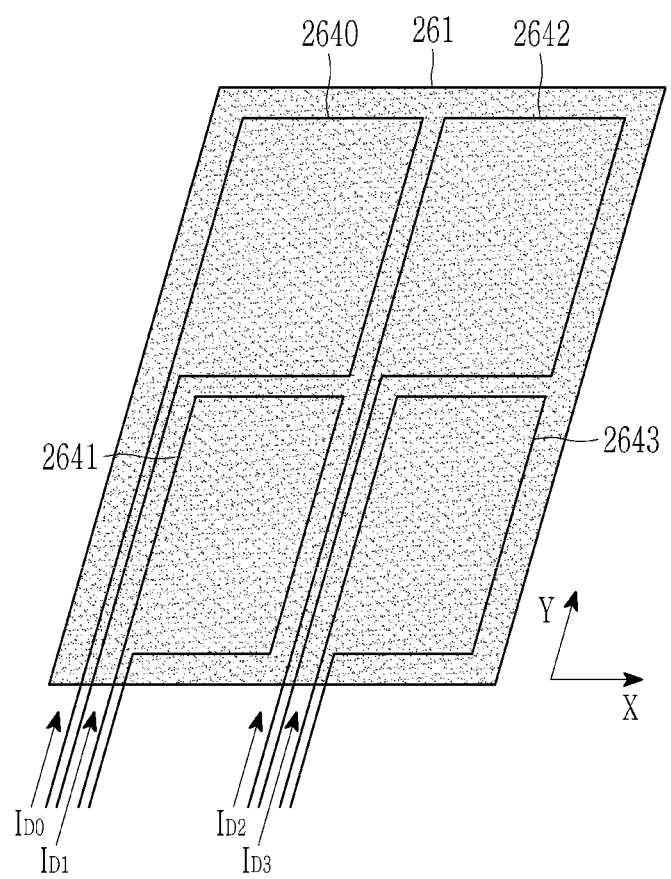

FIG. 4 to FIG. 6 each illustrate a disposal form of a touch panel and a loop coil. As illustrated in FIG. 4, the loop coil 264 may be positioned to surround a periphery of the touch panel 261 without overlapping with the touch panel 261. A current ID having an AC waveform by the driving signal is applied to the loop coil 264.

As illustrated in FIG. 5, the loop coil 264 may be positioned in an area overlapping the touch panel 261. The current ID having an AC waveform by the driving signal is applied to the loop coil 264.

As illustrated in FIG. 6, the loop coil 264 may include a plurality of sub-loop coils 2640, 2641, 2642, and 2643. The sub-loop coils 2640, 2641, 2642, and 2643 may be positioned in an area overlapping the touch panel 261, but the present disclosure is not limited thereto. Currents $I_{D0}$, $I_{D1}$, $I_{D2}$, and IDs each having an AC waveform by the driving signal are respectively applied to the sub-loop coils 2640, 2641, 2642, and 2643.

Figure 7:
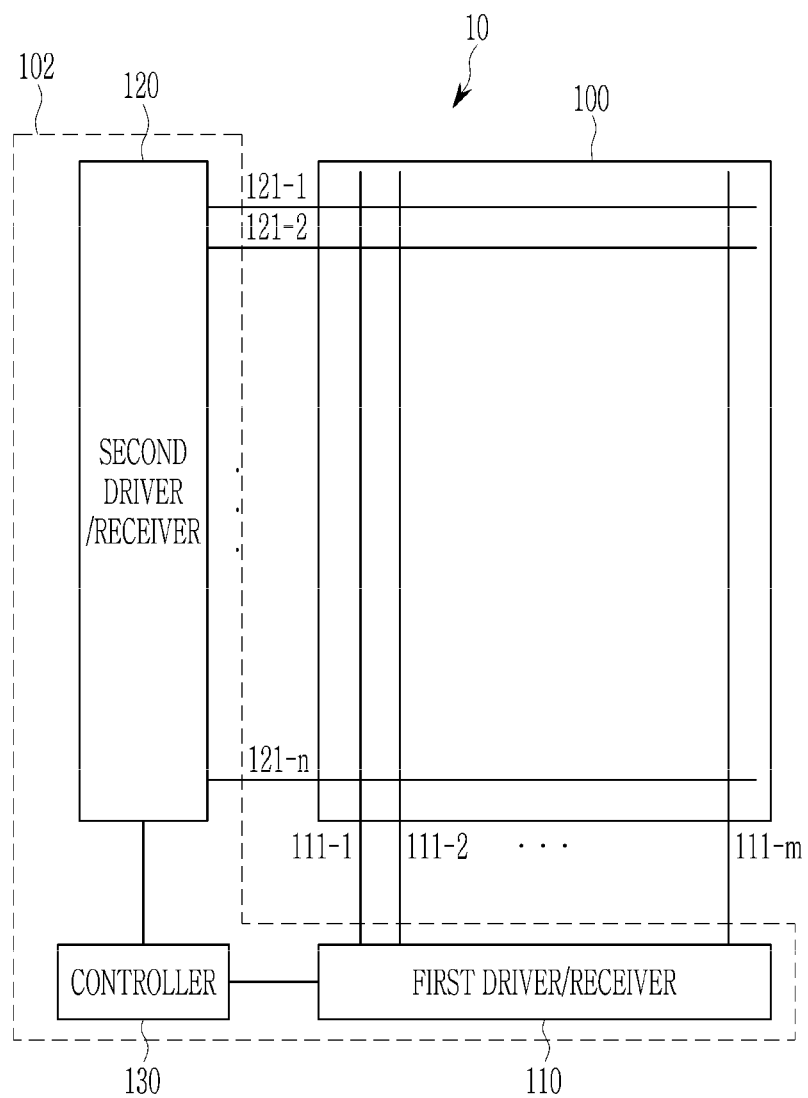
FIG. 7 schematically illustrates a touch sensor according to an embodiment.

FIG. 7 schematically illustrates a touch sensor according to an embodiment.

The touch sensor 260 according to an embodiment includes a touch panel 261 and a touch controller 262 for controlling the touch panel 261. The touch controller 262 may include a driver 2620 and a receiver 2622 that transmit and receive signals to and from the touch panel 261, and a controller 2624.

The touch panel 261 may include: a plurality of first touch electrodes 111-1 to 111-$m$ for detecting touch coordinates in a first direction; and a plurality of second touch electrodes 121-1 to 121-$n$ for detecting touch coordinates in a second direction intersecting the first direction. For example, the touch panel 261 includes a plurality of first touch electrodes 111-1 to 111-$m$ having a form extending in the second direction, and a plurality of second touch electrodes 121-1 to 121-$n$ having a form extending in the first direction crossing the second direction. In the touch panel 261, the first touch electrodes 111-1 to 111-$m$ may be arranged along the first direction, and the second touch electrodes 121-1 to 121-$n$ may be arranged along the second direction.

The first touch electrodes 111-1 to 111-$m$ are connected to the driver 2620, and the second touch electrodes 121-1 to 121-$n$ are connected to the receiver 2622. In FIG. 7, the driver 2620, the receiver 2622, and the controller 2624 are separated from each other, but may be implemented as one module, unit, or chip, and the present invention is not limited thereto.

The driver 2620 may apply a driving signal to the first touch electrodes 111-1 to 111-$m$. The receiver 2622 may receive a detection signal from the second touch electrodes 121-1 to 121-$n$.

Although it has been described above that the touch sensor 260 is implemented in a mutual capacitance method, the touch sensor 260 may be implemented in a self-capacitance method, and it will be easy for a person skilled in the art to appropriately modify the touch electrodes 111-1 to 111-$m$ and 121-1 to 121-$n$, the driver 2620, and the receiver 2622 in the mutual capacitance method, to add a new component, or to omit some components and to modify them to fit the self-capacitance method.

FIG. 8 to FIG. 12 each illustrate a state where a stylus pen is close to an electronic device.

As illustrated in FIG. 8 to FIG. 12, a stylus pen 10 and a touch screen 20 may be close to each other.

The stylus pen 10 of FIG. 8 to FIG. 12 may generate a touch input (a resonance signal or an active touch signal) by resonating with a driving signal applied to a touch electrode 21.

The touch screen 20 of FIG. 8 to FIG. 12 includes a display panel 251 and a touch panel 261 on the display panel 251. The touch panel 261 may include a substrate 23, a touch electrode 21 on the substrate 23, and a window 22 on the touch electrode 21.

The substrate 23 may be an encapsulation substrate of the display panel 251, which may be implemented by a transparent material.

The touch electrode 21 includes a plurality of first touch electrodes for detecting touch coordinates in a first direction and a plurality of second touch electrodes for detecting touch coordinates in a second direction crossing the first direction. For example, the touch electrode 21 may include a plurality of first touch electrodes having a shape extending in the second direction and a plurality of second touch electrodes having a shape extending in the first direction crossing the second direction, the first touch electrodes may be arranged along the first direction, and the second touch electrodes may be arranged along the second direction. Although the touch electrode 21 is illustrated as a single layer in FIG. 8, the first touch electrode and the second touch electrode may be positioned on different layers from each other, but the present invention is not limited thereto.

A window 22 may be positioned on the touch electrodes layer 21. The touch electrode 21, the conductive tip 11, and the window 22 may constitute a capacitor Cx. Accordingly, a signal (a resonance signal or an active touch signal) generated by the stylus pen 10 may be transferred to the touch electrode 21.

As illustrated in FIG. 8 to FIG. 11, the resonance circuit 12 may mutually resonate with the loop coil 264, and a degree of mutual resonance occurring between an inductor and the loop coil 264 of the resonance circuit 12 is affected by a mutual inductance M. Alternatively, the resonance circuit 12 may resonate with a magnetic field generated by the loop coil 264.

Figure 8:
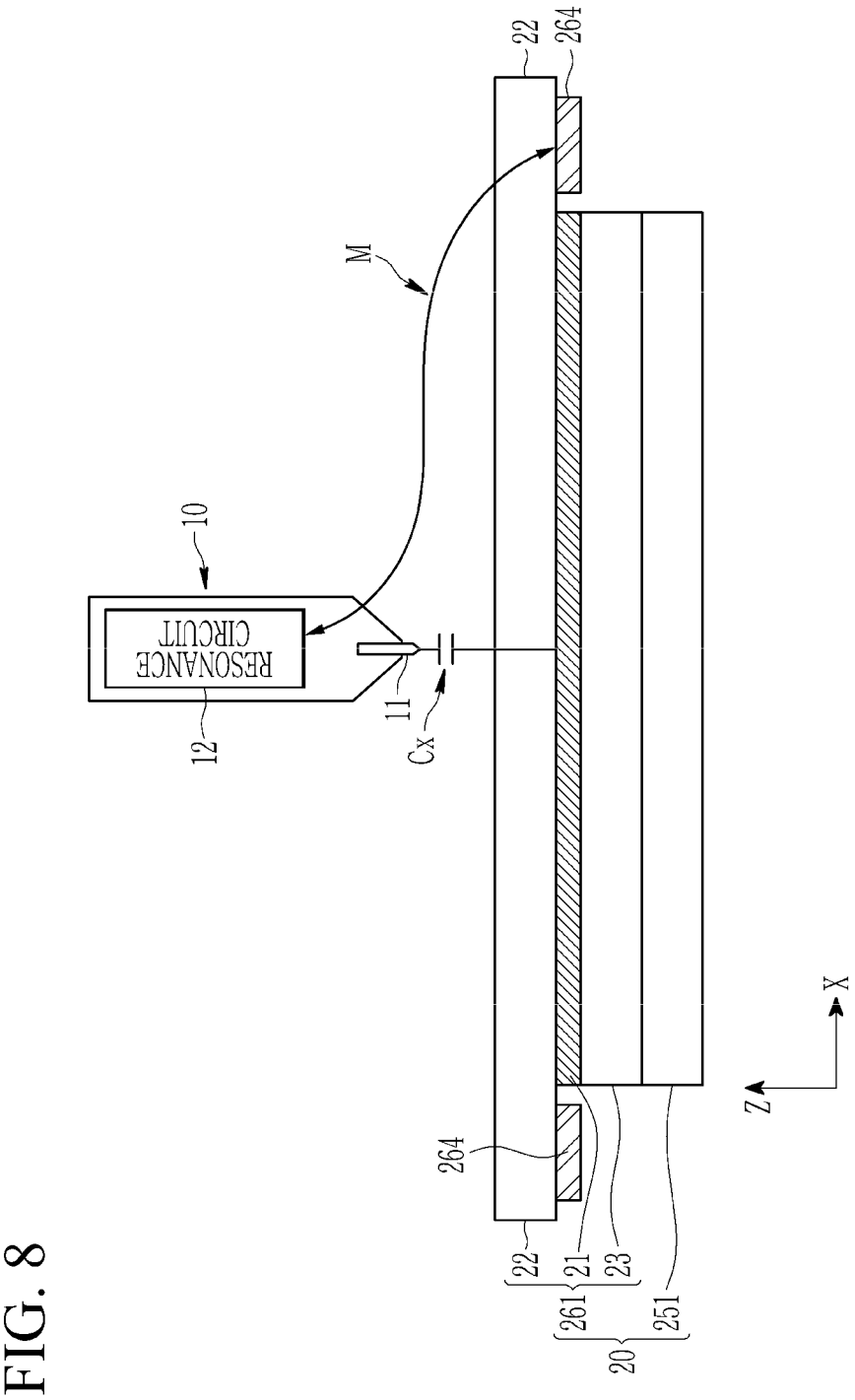
FIG. 8 to FIG. 12 each illustrate a state where a stylus pen is close to an electronic device.
Figure 9:
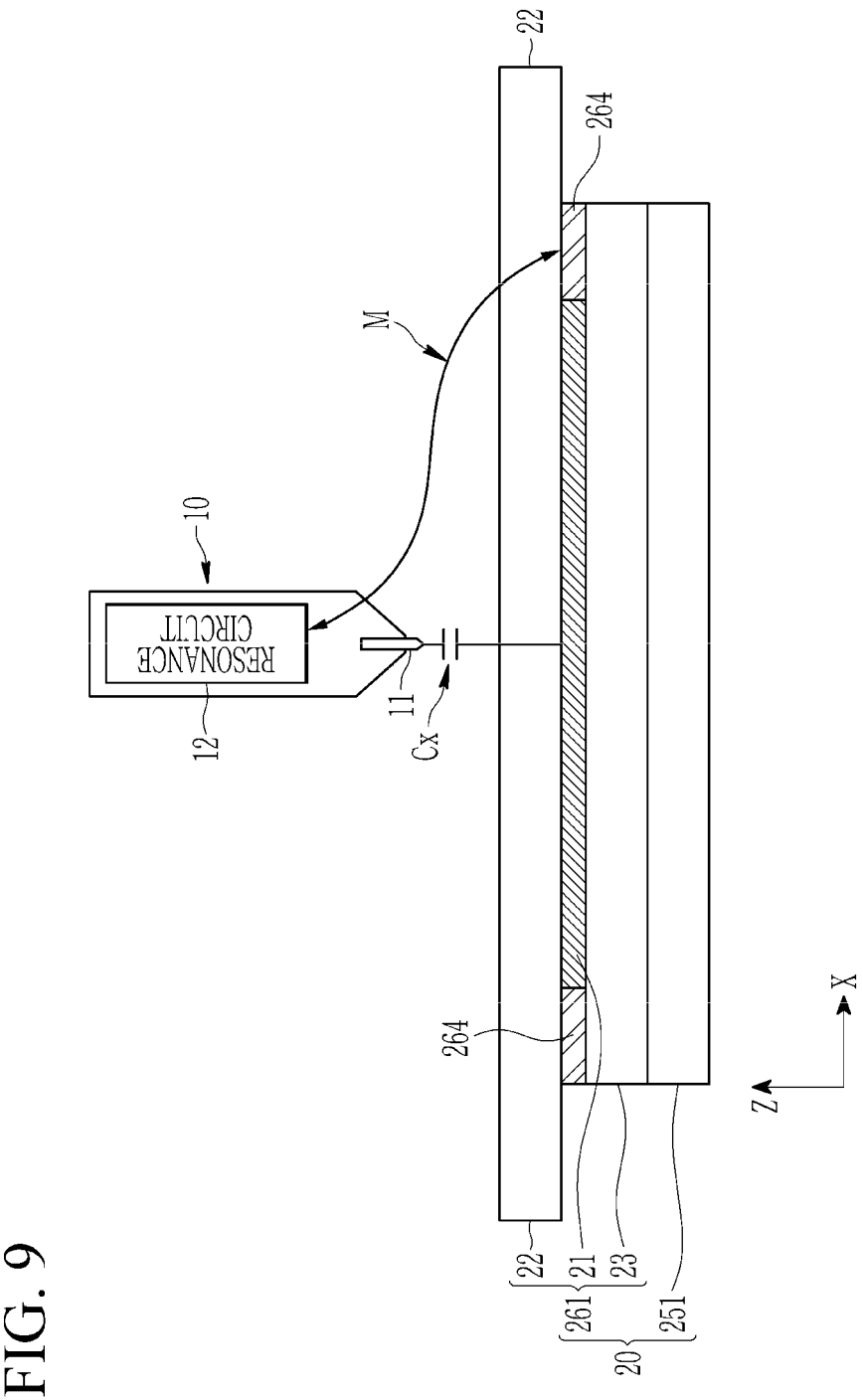
Figure 10:
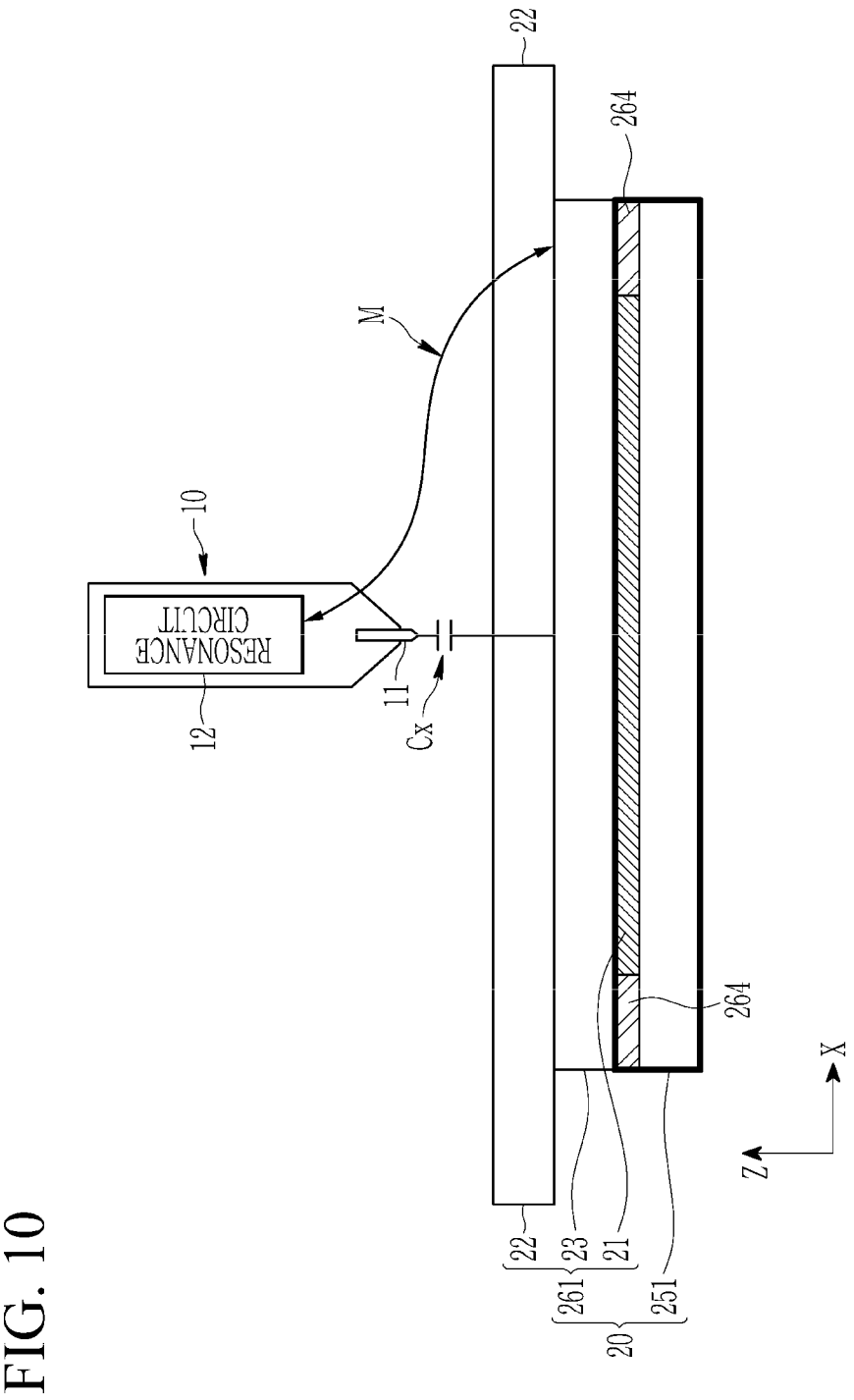

As illustrated FIG. 8, FIG. 9, and FIG. 10, the loop coil 264 may be positioned in an area that does not overlap the touch panel 261.

Referring to FIG. 8, the loop coil 264 may be printed on the window 22 by a method such as photolithography, thin film sputtering, or the like, or may be printed on a sheet by a method such as photolithography, thin film sputtering, or the like and attached to the window 22, and a manner for positioning the loop coil 264 on the window 22 is not limited to the above description.

FIG. 9 illustrates a disposal of the loop coil 264 positioned in a same layer as that of the touch electrode 21 in the case of an on-cell type of touch sensor, and FIG. 10 illustrates a disposal of the loop coil 264 positioned on a same layer as that of the touch electrode 21 in the case of an in-cell type of touch sensor.

Referring to FIG. 9 and FIG. 10, the loop coil 264 may be positioned on the same layer as that of the touch electrode 21. The loop coil 264 may be made of a same material as that of the touch electrode 21. However, the loop coil 264 may be positioned in a different layer than that of the touch electrode 21, and may be made of a different material.

In FIG. 9, the loop coil 264 and the touch electrode 21 are positioned in a same layer on an encapsulation substrate 23 of the display panel 251.

In FIG. 10, the display panel 251 includes a touch electrode 21 and a loop coil 264. That is, the substrate 23 may be a color filter substrate of the display panel 251, and the touch electrode 21 and the loop coil 264 may be positioned between the color filter substrate 23 and a TFT substrate of the display panel 251. Alternatively, both the touch electrode 21 and the loop coil 264 may be positioned on upper and lower portions of the color filter substrate 23.

Figure 11:
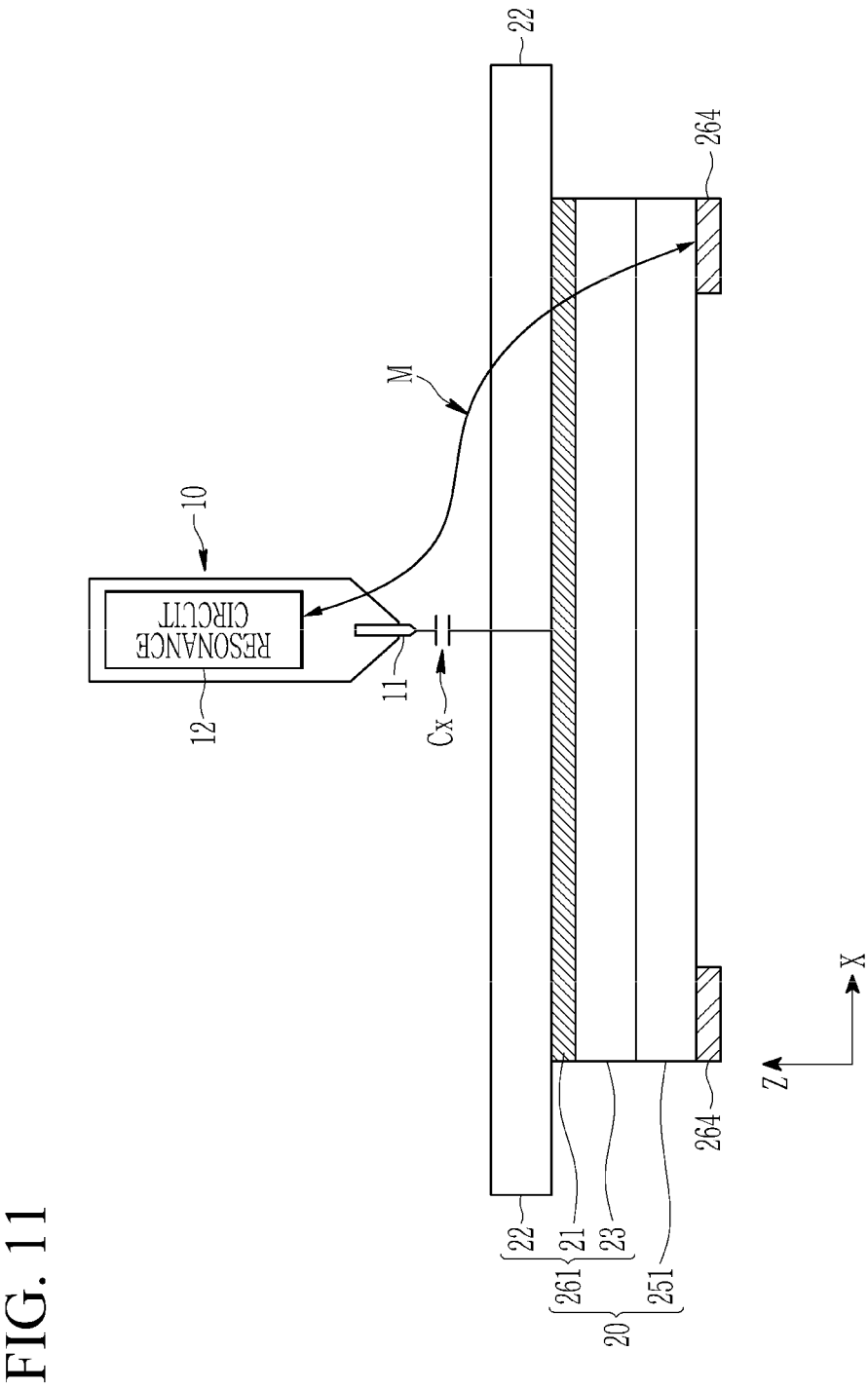
Figure 12:
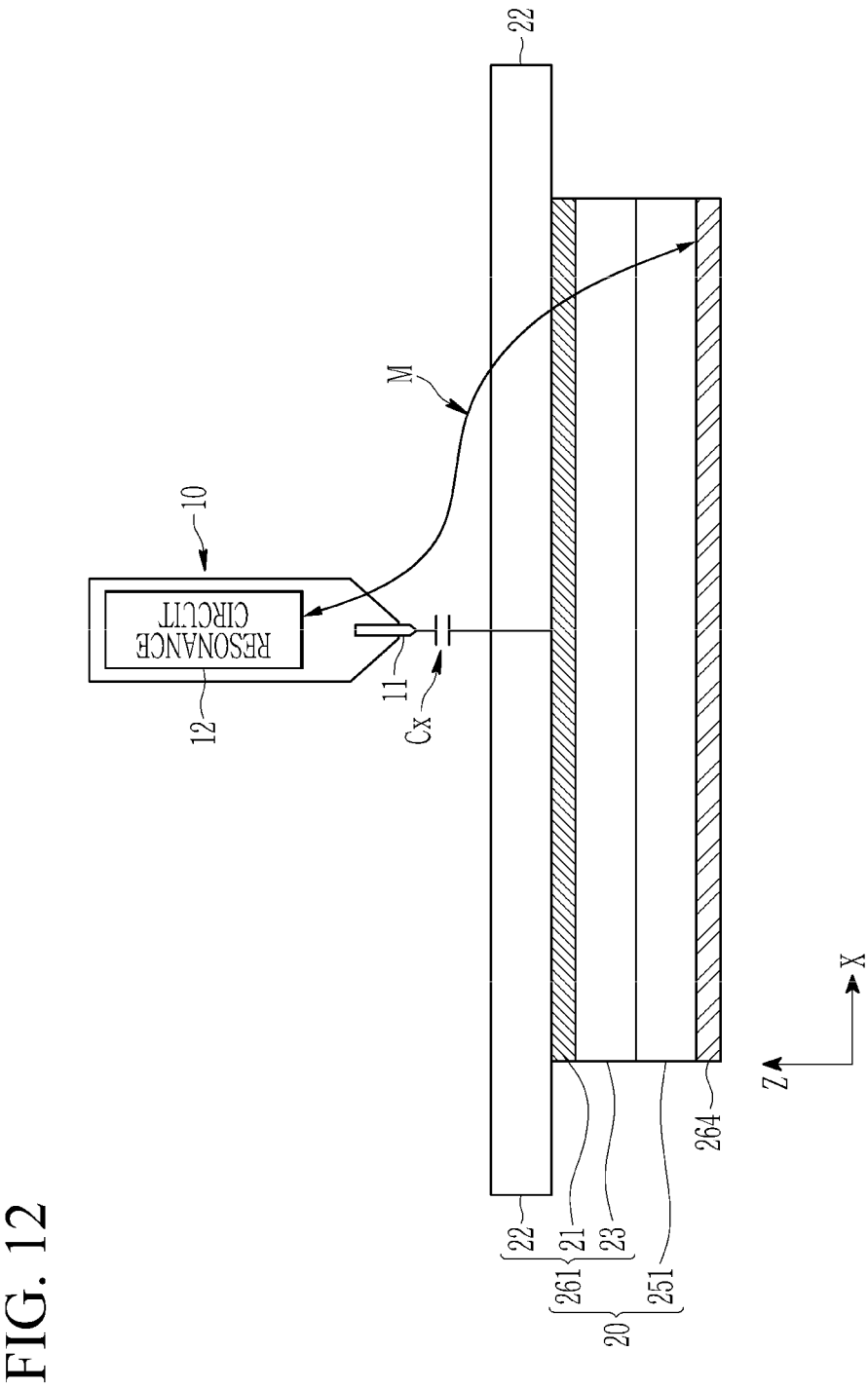

As illustrated FIG. 11 and FIG. 12, the loop coil 264 may be positioned in an area that overlaps the touch panel 261. The loop coil 264 may be directly printed on the substrate of the display panel 251 by a method such as photolithography or thin film sputtering, or may be printed on a sheet by a method such as photolithography or thin film sputtering and attached to the substrate of the display panel 251, and a manner for positioning the loop coil 264 on the substrate of the display panel 251 is not limited to the above description.

As illustrated in FIG. 11, the loop coil 264 may be positioned only at a position close to an outer shell of the touch panel 261, or as illustrated in FIG. 12, the loop coil 264 may be positioned to correspond to an entire area of the touch panel 261.

In addition, the loop coil 264 may be positioned in a different layer than that of the touch electrode 21. However, as illustrated in FIG. 9A and FIG. 9B, the loop coil 264 may be positioned on the same layer as the touch electrode 21 in an area overlapping the touch panel 261, and may be made of a same material.

FIG. 13 to FIG. 18 each illustrate a schematic circuit diagram showing a stylus pen and an electronic device. The resonance circuit 12 of FIG. 3 may be expressed as an equivalent circuit including a resistor Rp, an inductor Lp, and a capacitor Cp or an equivalent circuit including a resistor Rs, an inductor Ls, and a capacitor Cs.

Figure 13:
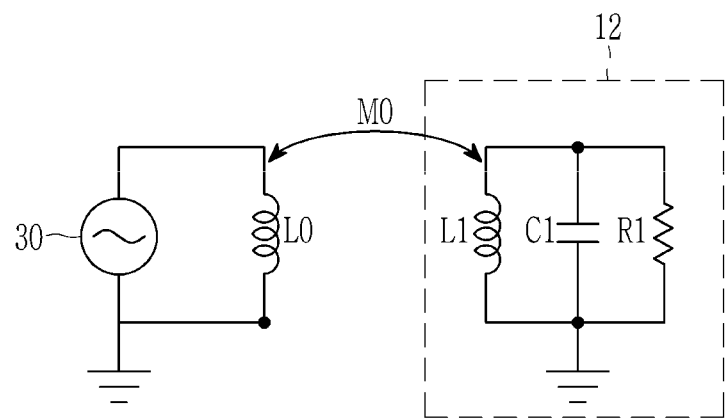
FIG. 13 to FIG. 18 each illustrate a schematic circuit diagram showing a stylus pen and an electronic device.
Figure 14:
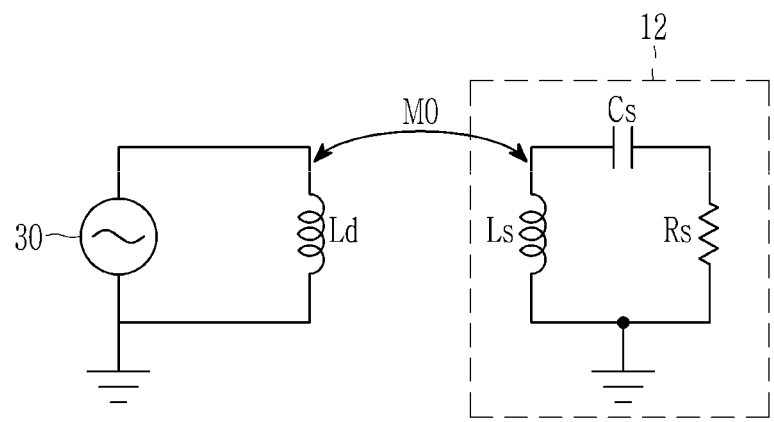

As illustrated in FIG. 13 and FIG. 14, when a loop coil L0 forms a magnetic field by a driving signal 30, a current may be induced in the inductor LP of the stylus pen 10 to resonate the resonance circuit 12. Even in a state in which the stylus pen 10 is not in direct contact with the window 22 (i.e., in a hovering state), the resonance circuit 12 may resonate by the magnetic field generated by the loop coil L0.

As illustrated in FIG. 15 to FIG. 18, when the loop coil and the internal capacitor resonate by the driving signal 30, the resonance circuit 12 of the stylus pen 10 may also mutually resonate with the loop coil and the internal capacitor.

Figure 15:
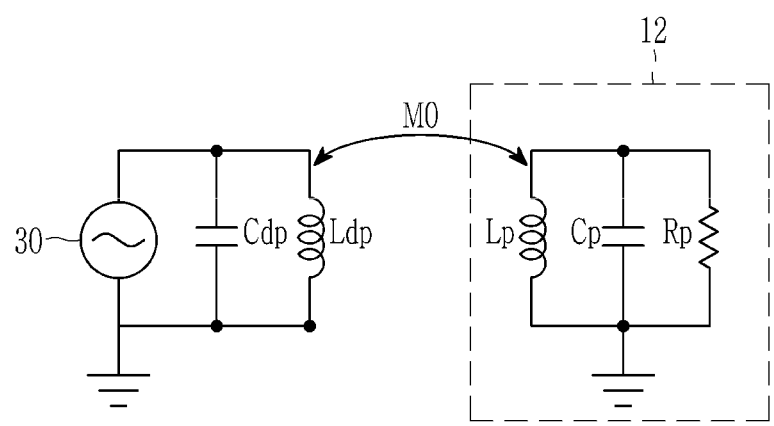

FIG. 15 illustrates a case in which a loop coil Ldp and an internal capacitor Cdp are connected in parallel, and the resistor Rp, the inductor Lp, and the capacitor Cp of the resonance circuit 12 are connected in parallel.

Figure 16:
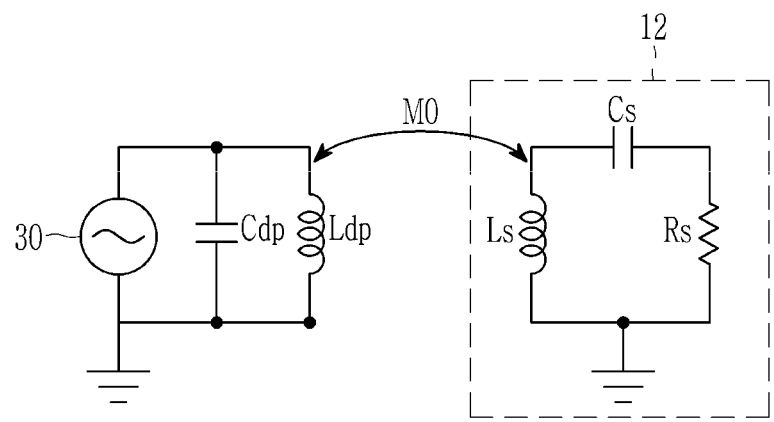

FIG. 16 illustrates a case in which the loop coil Ldp and the internal capacitor Cdp are connected in parallel, and the resistor Rs, the inductor Ls, and the capacitor Cs of the resonance circuit 12 are connected in series.

Figure 17:
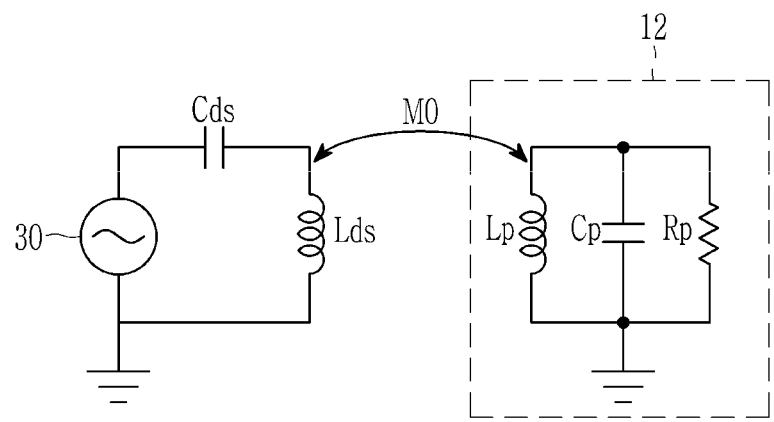

FIG. 17 illustrates a case in which a loop coil Lds and an internal capacitor Cds are connected in series, and the resistor Rp, the inductor Lp, and the capacitor Cp of the resonance circuit 12 are connected in parallel.

Figure 18:
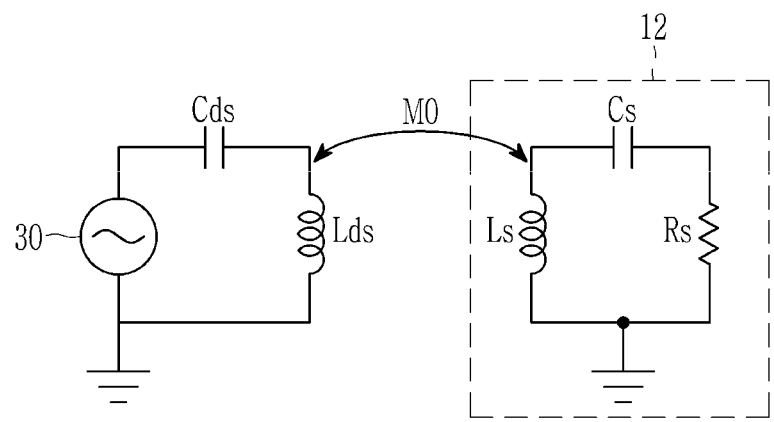

FIG. 18 illustrates a case in which the loop coil Lds and the internal capacitor Cds are connected in series, and the resistor Rs, the inductor Ls, and the capacitor Cs of the resonance circuit 12 are connected in series.

Even in the state in which the stylus pen 10 is not in direct contact with the window 22 (i.e., in the hovering state), the resonance circuit 12 may resonate through mutual resonance with the loop coil Lds or Ldp.

Figure 19:
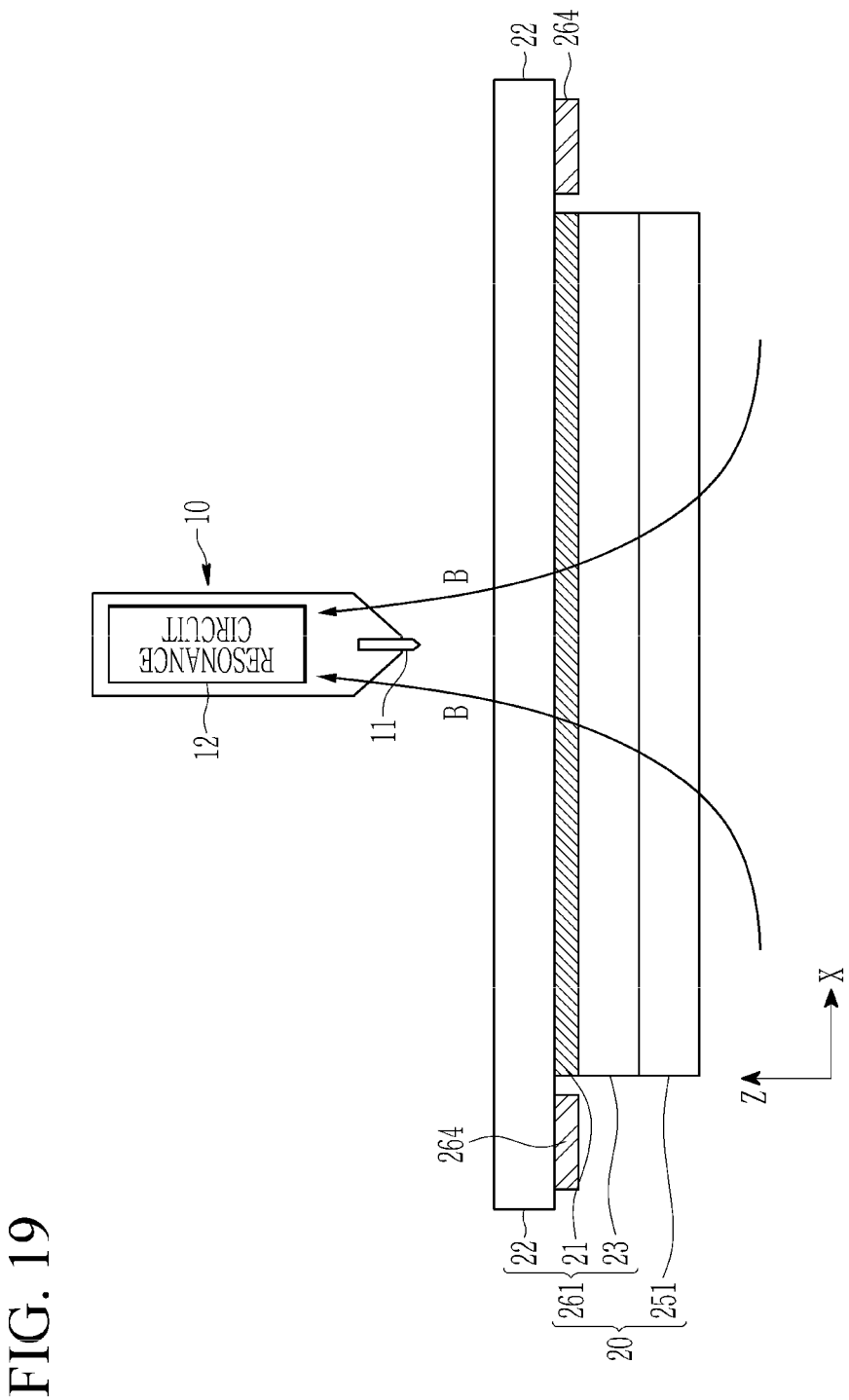
FIG. 19 and FIG. 20 each illustrate a state in which a stylus pen is close to an electronic device to transmit and receive a signal.
Figure 20:
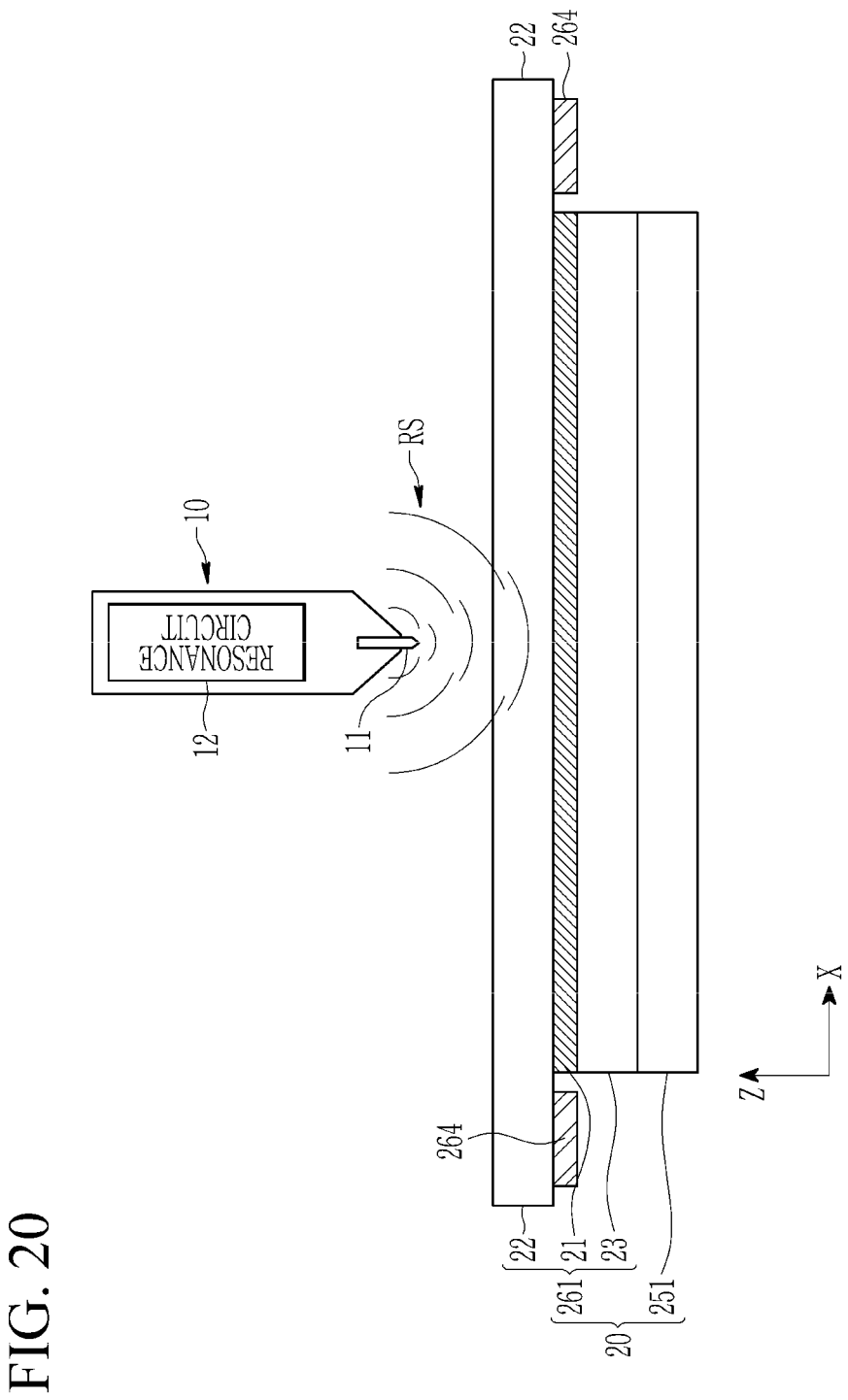

FIG. 19 and FIG. 20 each illustrate a state in which a stylus pen is close to an electronic device to transmit and receive a signal.

As illustrated in FIG. 19, when a driving signal is applied to the loop coil 264, the resonance circuit 12 resonates by a magnetic field B generated therefrom. Then, as illustrated in FIG. 20, a signal RS from the stylus pen 10 may be directly transferred from the conductive tip 11 to the touch electrode 21, or may be transferred to the touch electrode 21 through the air or a non-conductive housing.

Figure 21:
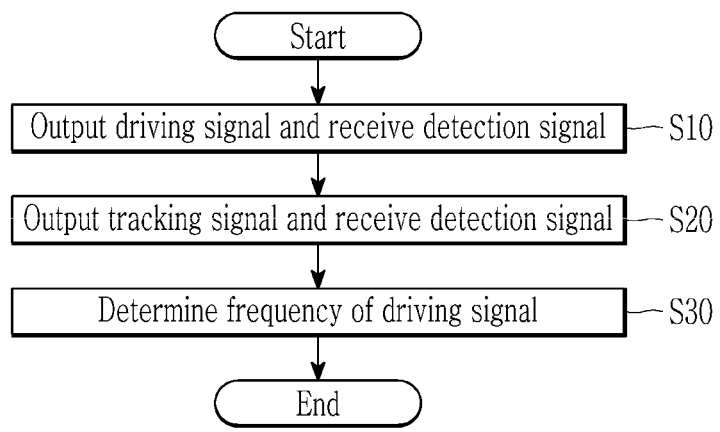
FIG. 21 illustrates a flowchart showing a driving method of an electronic device according to an embodiment.

FIG. 21 illustrates a flowchart showing a driving method of an electronic device according to an embodiment.

The electronic device 2 outputs a driving signal and receives a detection signal (S10).

Specifically, the coil driver 263 may apply a driving signal of an AC waveform for resonating the resonance circuit 12 of the stylus pen 10 to the touch panel 261 of the loop coil 264, and may receive a signal resonated from the stylus pen 10 based on the driving signal as a detection signal or receive an output signal of the stylus pen 10 based on the resonance signal as a detection signal.

For example, the coil driver 263 applies the driving signal to the loop coil 264. Then, the resonance circuit 12 of the stylus pen 10 resonates with the drive signal, thereby generating a resonance signal, which is transferred to the touch panel 261 through the conductive tip 11. The touch controller 262 receives the detection signal transferred to the touch panel 261. The touch controller 262 may process the received detection signal to transfer it to the controller 270.

The electronic device 2 outputs a tracking signal of a predetermined frequency and receives a detection signal (S20).

The coil driver 263 may apply the tracking signal to the loop coil 264, and may receive a signal resonated from the stylus pen 10 based on the tracking signal as a detection signal or receive an output signal of the stylus pen 10 based on the resonance signal as a detection signal. The tracking signal may include a signal (e.g., a sine wave, a square wave, etc.) having a different frequency from the driving signal of step S10, and the resonance circuit 12 of the stylus pen 10 may resonate with the tracking signal.

For example, the coil driver 263 applies the tracking signal to the loop coil 264. Then, the resonance circuit 12 of the stylus pen 10 resonates with the tracking signal, thereby generating a resonance signal, which is transferred to the touch panel 261 through the conductive tip 11. The touch controller 262 receives the detection signal transferred to the touch panel 261. The touch controller 262 may process the received detection signal to transfer it to the controller 270.

Steps S10 and S20 may be performed continuously or discontinuously in time, each of them may be performed between frames, or they may be performed within one frame. An order of applying the driving signal and the tracking signal is not limited to the description of the present disclosure.

The electronic device 2 outputs and receives a driving signal (S30).

The electronic device 2 may determine a frequency of the driving signal based on the tracking signal received in step S20. The electronic device 2 may determine the frequency of the driving signal by using at least one of a magnitude, a phase, or a frequency of the detection signal received in step S20. That is, the electronic device 2 may determine the frequency of the driving signal by using a change in the detection signal received in step S20.

For example, when the magnitude of the detection signal received in step S20 is greater than that of the detection signal received in step S10, the electronic device 2 may determine the frequency of the driving signal closer to the frequency of the tracking signal in step S20 than that of the driving signal in step S10.

As another example, when a difference between the phases of the detection signal received in step S20 and the detection signal received in step S10 is smaller than a reference phase (e.g., –90°), the electronic device 2 may determine the frequency of the driving signal closer to the frequency of the tracking signal in step S20 than that of the driving signal in step S10.

As yet another example, in the case where the active stylus module 60 of the stylus pen 10b changes a frequency of a signal transmitted to the touch screen 20 depending on energy transferred from the resonance circuit 12, when the frequency of the detection signal received in step S20 is higher than that of the detection signal received in step S10, the electronic device 2 may determine the frequency of the driving signal closer to the frequency of the tracking signal in step S20 than that of the driving signal in step S10.

Next, a driving signal applied within one frame period 1F and a resonance signal of the stylus pen 10 will be described with reference to FIG. 22.

Figure 22:
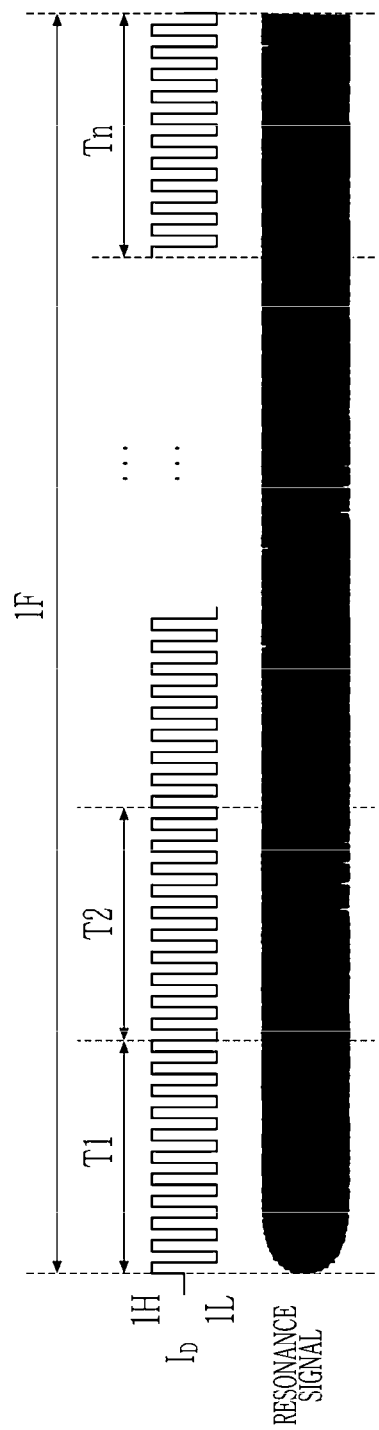
FIG. 22 illustrates a waveform diagram showing an example of a driving signal depending on the driving method of FIG. 21.

FIG. 22 illustrates a waveform diagram showing an example of a driving signal according to the driving method of FIG. 21.

A plurality of time periods T1, T2, . . . , and Tn are included in one frame period 1F. A length of one frame period 1F depends on a degree to which the touch controller 262 reports touch data to an external device.

The coil driver 263 applies a driving signal of a first frequency to the loop coil 264 during some of the time periods T1, T2, . . . , and Tn within an arbitrary frame period 1F. The coil driver 263 outputs a driving signal (tracking signal) of a second frequency to the loop coil 264 during some other of the time periods T1, T2, . . . , and Tn. Herein, a frame outputting the tracking signal may be repeated every frame. Alternatively, the tracking signal may be outputted only during some of a plurality of frame periods. In this case, some frame periods may be temporally continuous frames or non-consecutive frames.

For example, during some time periods T1, T2, . . . , the coil driver 263 applies the driving signal of the first frequency to the loop coil 264, and during some other time period Tn, the coil driver 263 applies the driving signal of the second frequency to the loop coil 264.

A time period for applying the tracking signal to the loop coil 264 during one frame period 1F may be an initial time period T1 of one frame period 1F, a last time period Tn of one frame period 1F, and at least one of intermediate time periods of one frame period 1F. When a plurality of time periods for applying the tracking signal during one frame period 1F exist within one frame period 1F, the time periods may or may not be continuous in time.

The coil driver 263 may change a frequency of the tracking signal applied to the loop coil 264.

Specifically, the frequency of the tracking signal may be increased or decreased in units of one frame period 1F or several frame periods. For example, when the frequency of the tracking signal that is outputted during a first frame period is 300 kHz, the frequency of the tracking signal that is outputted during a subsequent second frame period may be 303 kHz. Alternatively, when the frequency of the tracking signal outputted during first ten frame periods is 300 kHz, the frequency of the tracking signal outputted during next ten frame periods may be 297 kHz.

In addition, the frequency of the tracking signal may increase or decrease during the time periods T1, T2, . . . , and Tn within one frame period 1F. Specifically, when the frequency of the tracking signal outputted during the time period T1 within one frame period 1F is 300 kHz, the frequency of the tracking signal outputted during at least one of the subsequent time periods T2, . . . , and Tn may be 303 kHz.

As another example, as time elapses, the touch sensor 260 may increase the frequency of the tracking signal from a lower limit to an upper limit within a predetermined range of a reference frequency (e.g., 300 kHz), or may determine the frequency of the driving signal by decreasing it from the upper limit to the lower limit within the predetermined range of the reference frequency.

As yet another example, the touch sensor 260 may change the frequency of the tracking signal within a first range (e.g., 285 kHz to 315 kHz for 5%) of the reference frequency (e.g., 300 kHz) to determine the frequency of the driving signal, and may determine the frequency of the driving signal by changing the frequency of the tracking signal within a second range (e.g., 270 kHz to 330 kHz for 10%).

As yet another example, the touch sensor 260 may perform a coarse search and then a fine search to determine the frequency of the driving signal. For example, the touch sensor 260 may search the frequency of the driving signal in units of 20 kHz, then may detect the frequency of the drive signal in units of 5 kHz within a 20 kHz range, and then may search the frequency of the drive signal in units of 1 kHz within a 5 kHz range.

A frequency range around the reference frequency may be divided into a plurality of first frequency sections in units of a first frequency. One first frequency section may be divided into a plurality of second frequency sections as a unit of a second frequency. The touch sensor 260 selects and outputs at least one frequency in each of the first frequency sections as the frequency of the tracking signal outputted during each of the time periods, and then determines at least one first frequency section based on a correspondingly received detection signal. The touch sensor 260 may select and output at least one frequency in each of the second frequency sections within the determined at least one first frequency section as the frequency of the tracking signal outputted during each of the time periods, and then may determine the frequency of the driving signal based on the correspondingly received detection signal.

For example, the frequency range (270 kHz to 330 kHz) around a reference frequency (300 kHz) is divided by a first frequency unit (2 kHz). Then, the frequency range around the reference frequency is divided into 30 first frequency sections. In addition, one first frequency section (2 kHz) is divided by a second frequency unit (200 Hz). Then, one first frequency section (2 kHz) is divided into ten second frequency sections.

It is assumed that one frame includes 10 time periods (e.g., T1, T2, . . . , and T10). Then, the tracking signal in a frequency range of 270 kHz to 290 kHz may be outputted for 10 time periods in the first frame. In this case, frequencies of the tracking signals outputted during each time period may be different from each other. During the first time period of the first frame, a tracking signal of an arbitrary frequency (e.g., 271 kHz) that is selected within a range of 270 kHz or more and less than 272 kHz is outputted, and a corresponding detection signal is received. During the second time period of the first frame, a tracking signal of an arbitrary frequency (e.g., 272.8 kHz) that is selected within a range of 272 kHz or more and less than 274 kHz is outputted, and a corresponding detection signal is received. The touch sensor 260 may receive a detection signal by changing the frequency of the tracking signal during the other time periods, and may also output a tracking signal in the frequency range of 290 kHz to 330 kHz for a total of 20 time periods within the second and third frames after the first frame, and detection signals corresponding thereto are received. The touch sensor 260 determines at least one first frequency section based on at least one of a magnitude (amplitude) or a phase of a detection signal obtained in each time period corresponding to each of the 30 first frequency sections. In the above, it has been described that the frequency of the driving signal applied in each time period sequentially increases, but the frequency of the driving signal may sequentially decrease, or may increase or decrease in response to the increase or decrease of the detection signal (e.g., when the frequency is increased compared to the first time period, but the magnitude of the detection signal is decreased, the control is performed in a direction to decrease the frequency), but the present disclosure is not limited to the above description. In the above, the tracking signal is changed and outputted during time periods within one frame, but the tracking signal may be changed and outputted during time periods within a plurality of frames, and the present disclosure is not limited to the above description.

It is assumed that the first frequency section in the range of 272 kHz or more and less than 274 kHz is determined. The tracking signal of the first frequency section of the range of 272 kHz or more and less than 274 kHz during ten time periods in the subsequent fourth frame is outputted, and in this case, frequencies of the tracking signal outputted during each time period may be different from each other. During the first time period, a tracking signal of an arbitrary frequency (e.g., 272.0 kHz) that is selected within a range of 272 kHz or more and less than 272.2 kHz is outputted, and a corresponding detection signal is received. During the second time period of the first frame, a tracking signal of an arbitrary frequency (e.g., 272.2 kHz) that is selected within a range of 272.2 kHz or more and less than 272.4 kHz is outputted, and a corresponding detection signal is received. The touch sensor 260 may receive the detection signal by changing the frequency of the tracking signal in the other time periods. The touch sensor 260 determines the frequency of the driving signal based on at least one of an amplitude or a phase of a detection signal obtained corresponding to each of the ten first frequency sections.

The touch sensor 260 may further include a memory storing profiles for frequency curves in which an X-axis is the frequency value of the driving signal and a Y-axis is the magnitude of the received detection signal. In this case, the touch sensor 260 may output a tracking signal corresponding to at least two first frequency sections, and may predict a frequency value corresponding to a maximum value of the detection signal by using magnitudes of the received detection signals (or a difference in magnitude of the detection signals or an inclination on an XY plane), and may determine the frequency of the driving signal by changing the frequency of the tracking signal within a predetermined frequency section including the corresponding frequency value.

In addition, the profiles stored in the memory correspond to frequency curves having different shapes depending on temperature, humidity, and the like. In this case, the touch sensor 260 may receive information related to temperature, humidity, etc. from an external unit (e.g., a host 270 of FIG. 21), and may read a profile for a corresponding frequency curve from the memory based on the information. The touch sensor 260 determines the frequency of the driving signal by using the signal that is detected during at least one frame period, and outputs the driving signal.

For example, the touch sensor 260 may determine the frequency of the driving signal outputted during a next frame period by using the signal detected during one frame period. Specifically, when the magnitude of the signal detected to correspond to the tracking signal having the frequency of 303 kHz during the first frame period is greater than that of the signal detected to correspond to the driving signal having the frequency of 300 kHz, the touch sensor 260 may output a driving signal having a frequency of 303 kHz during the second frame period. In this case, the frequency of the tracking signal outputted by the touch sensor 260 during the second frame period may be the same as or different from that of the tracking signal outputted during the first frame period.

As another example, the touch sensor 260 may determine a frequency of a driving signal outputted during a next plurality of frame periods by using the signal detected during the frame periods. Specifically, when an average magnitude of signals detected to correspond to tracking signals having a frequency of 303 kHz outputted during the first ten frame periods is greater than that of signals detected to correspond to driving signals having a frequency of 300 kHz outputted during the first ten frame periods, the touch sensor 260 may output a driving signal having a frequency of 303 kHz during next ten frame periods. Alternatively, it is possible to determine the frequency of the driving signal during the next ten frame periods by gradually increasing the frequency of the tracking signal during each of the ten frame periods and considering all the magnitudes of signals received during each frame period.

In addition, a period for applying the tracking signal, a frequency of the tracking signal, and a method for determining the driving signal may be changed in various ways, and the present disclosure is not limited to the above description.

Hereinafter, the touch sensor 260 and the electronic device 2 including the same according to another embodiment will be described with reference to FIG. 23 to FIG. 26.

Figure 23:
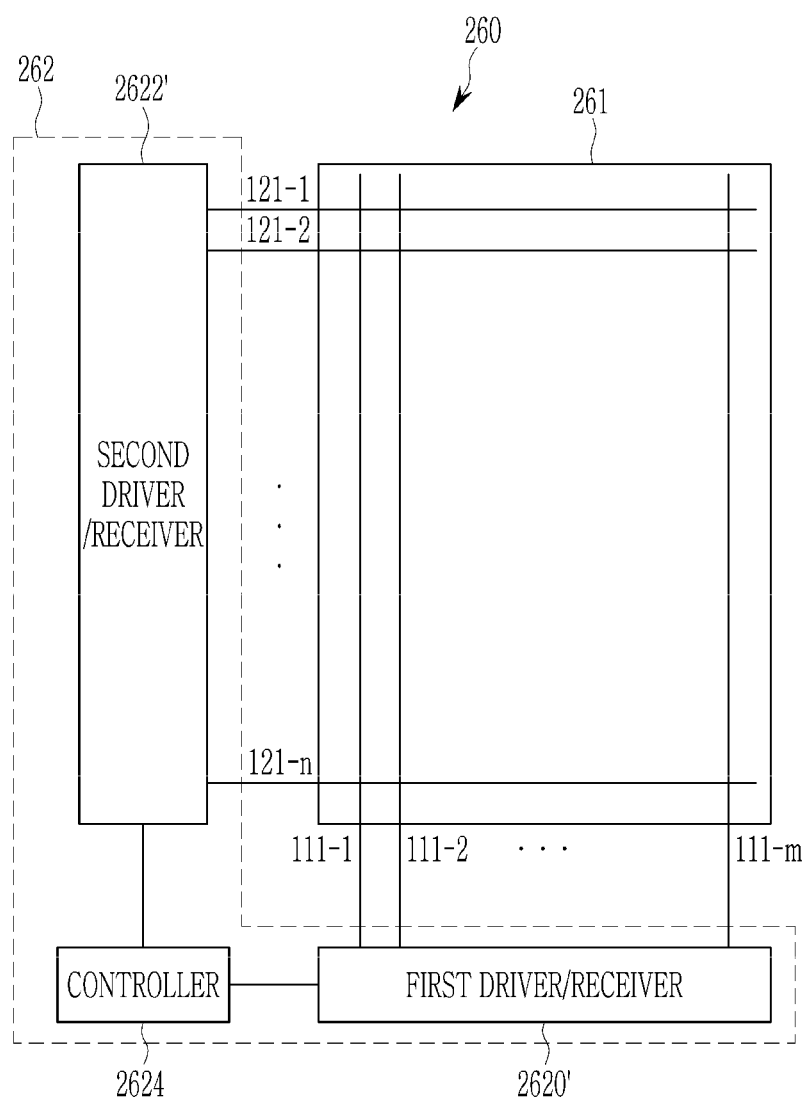
FIG. 23 schematically illustrates a touch sensor according to another embodiment.
Figure 24:
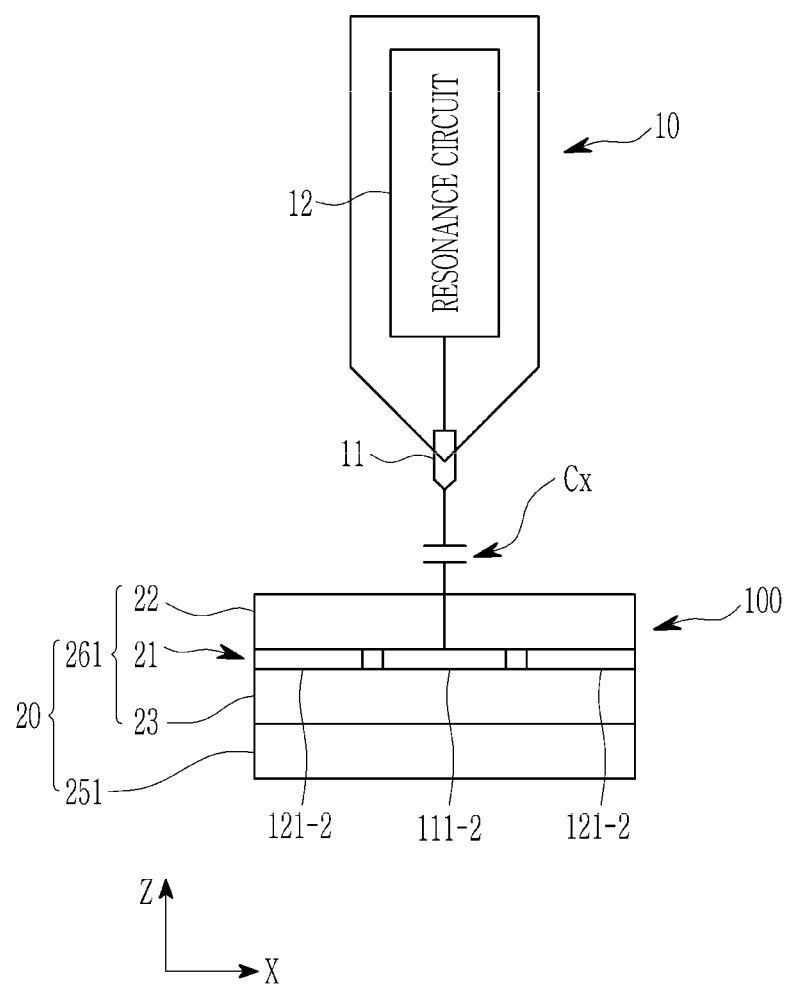
FIG. 24 illustrates an example in which a stylus pen is touched on a touch apparatus according to another embodiment.

FIG. 23 schematically illustrates a touch sensor according to another embodiment, and FIG. 24 illustrates an example in which a stylus pen is touched on a touch sensor according to another embodiment.

The touch sensor 260 according to another embodiment includes a touch panel 261 and a touch controller 262 for controlling the touch panel 261. The touch controller 262 may include first and second driver/receivers 2620' and 2622', and a controller 2624 for transmitting and receiving a signal to and from the touch panel 261. The touch sensor 260 of the present embodiment may not include the coil driver 263 and the loop coil 264.

The touch panel 261 includes: a plurality of first touch electrodes 111-1 to 111-$m$ for detecting touch coordinates in a first direction; and a plurality of second touch electrodes 121-1 to 121-$n$ for detecting touch coordinates in a second direction intersecting the first direction. For example, the touch panel 261 includes a plurality of first touch electrodes 111-1 to 111-$m$ having a form extending in the second direction, and a plurality of second touch electrodes 121-1 to 121-$n$ having a form extending in the first direction crossing the second direction. In the touch panel 261, the first touch electrodes 111-1 to 111-$m$ may be arranged along the first direction, and the second touch electrodes 121-1 to 121-$n$ may be arranged along the second direction.

The first touch electrodes 111-1 to 111-$m$ are connected to the first driver/receiver 2620', and the second touch electrodes 121-1 to 121-*n* are connected to the second driver/receiver 2622'. In FIG. 23, the first driver/receiver 2620', the second driver/receiver 2622', and the controller 2624 are separated from each other, but may be implemented as one module, unit, or chip, and the present disclosure is not limited thereto.

The first driver/receiver 2620' may apply a driving signal to at least one of the first touch electrodes 111-1 to 111-*m*. In addition, the first driver/receiver 2620' may receive a detection signal from at least one of the first touch electrodes 111-1 to 111-*m*. Similarly, the first driver/receiver 2622' may apply a driving signal to at least one of the second touch electrodes 121-1 to 121-*n*. In addition, the second driver/receiver 2622' may receive a detection signal from at least one of the second touch electrodes 121-1 to 121-*n*. That is, the first driver/receiver 2620' and the second driver/receiver' 2622 may be a type of transceiver for transmitting and receiving signals, and each may include a driver and a receiver.

As illustrated in FIG. 24, the touch screen 20 includes a display panel 251 and a touch panel 261 on the display panel 251. The touch panel 261 may include a substrate 23, a touch electrode 21 on the substrate 23, and a window 22 on the touch electrode 21.

The touch electrode 21 includes a plurality of first touch electrodes 111-1, 111-2, . . . , and 111-*m* and a plurality of second touch electrodes 121-1, 121-2, . . . , and 121-*n*. Although the touch electrode 21 is illustrated as a single layer in FIG. 23, the first touch electrodes and the second touch electrodes may be positioned on different layers from each other, but the present disclosure is not limited thereto.

A window 22 may be positioned on the touch electrodes layer 21. The touch electrode 21, the conductive tip 11, and the window 22 may constitute a capacitor Cx. Accordingly, a signal (a resonance signal or an active touch signal) generated by each of the stylus pens 10*a* and 10*b* may be transferred to the touch electrode 21.

The touch sensor 260 may be used to detect a touch input (direct touch or proximity touch) by a touch object. As illustrated in FIG. 23, the touch input of the stylus pen 10 proximate to the touch panel 261 may be sensed by the touch sensor 260.

Next, a driving method according to another embodiment will be described with reference to FIG. 25.

Figure 25:
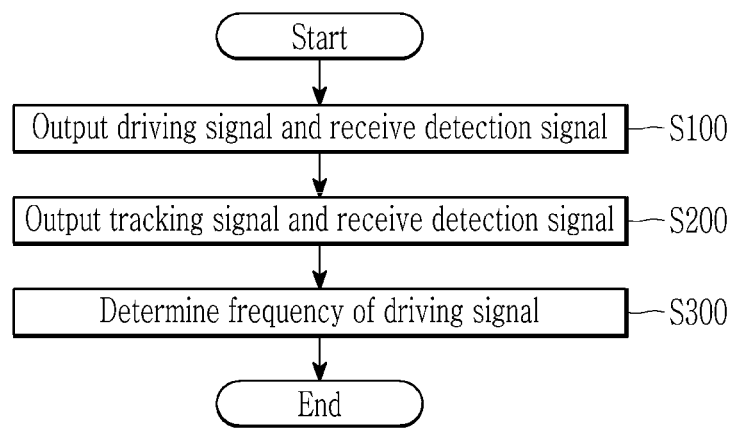
FIG. 25 illustrates a flowchart showing a driving method of a touch apparatus according to another embodiment.

FIG. 25 illustrates a flowchart showing a driving method of an electronic device according to another embodiment.

The electronic device 2 outputs and receives a driving signal (S100).

The electronic device 2 may apply a driving signal for detecting a touch input by the stylus pen 10 to the touch panel 261, and may receive a signal resonated by the stylus pen 10 as a detection signal based on the driving signal.

For example, the first driver/receiver 2620' simultaneously applies a driving signal to all of the first touch electrodes 111-1 to 111-*m*. Then, the resonance circuit 12 of the stylus pen 10 resonates with the drive signal, thereby generating a resonance signal, which is transferred to the touch panel 261 through the conductive tip 21. The first driver/receiver 2620' receives detection signals transferred from the first touch electrodes 111-1 to 111-*m*, and the second driver/receiver 2622 receives detection signals transferred from the second touch electrodes 121-1 to 121-*n*. The first driver/receiver 2620' and the second driver/receiver 2622' may process the received detection signals to transfer them to the controller 2624. In this case, the controller 2624 may process the detection signal to determine a position of the stylus pen 10.

In the above step (S100), it has been described that the first driver/receiver 2620' simultaneously applies the driving signal to all of the first touch electrodes 111-1 to 111-*m*, but in step S100, the first driver/receiver 2620' may apply the driving signal to at least one of the first touch electrodes 111-1 to 111-*m*, the second driver/receiver 2622' may apply the driving signal to at least one of the second touch electrodes 121-1 to 121-*n*, the first driver/receiver 2620' and the second driver/receiver 2622' may simultaneously apply the driving signal to at least one of the first touch electrodes 111-1 to 111-*m* and at least one of the second touch electrodes 121-1 to 121-*n*, the second driver/receiver 2622' may simultaneously apply the driving signal to all of the second touch electrodes 121-1 to 121-*n*, or the first driver/receiver 2620' and the second driver/receiver 2622' may simultaneously apply the driving signal to all of the first touch electrodes 111-1 to 111-*m* and all of the second touch electrodes 121-1 to 121-*n*. When the driving signals are applied to at least two different touch electrodes, phases of the driving signals applied to the respective touch electrodes may be equal to each other, or may have a phase difference in consideration of an RC delay of the touch electrode depending on a touch position of the stylus pen 10.

The electronic device 2 outputs a tracking signal of a predetermined frequency and receives a detection signal (S200).

The electronic device 2 may apply a tracking signal to the touch panel 261, and may receive a signal resonated by the stylus pen 10 as a detection signal based on the tracking signal. The tracking signal may include a signal (e.g., a sine wave, a square wave, etc.) having a different frequency from the driving signal of step S100, and the resonance circuit 12 of the stylus pen 10 may resonate with the tracking signal.

For example, the first driver/receiver 2620' simultaneously applies a tracking signal to all of the first touch electrodes 111-1 to 111-*m*. Then, the resonance circuit 12 of the stylus pen 10 resonates with the tracking signal, thereby generating a resonance signal, which is transferred to the touch panel 261 through the conductive tip 21. The first driver/receiver 2620' receives detection signals transferred from the first touch electrodes 111-1 to 111-*m*, and the second driver/receiver 2622 receives detection signals transferred from the second touch electrodes 121-1 to 121-*n*. The first driver/receiver 2620' and the second driver/receiver 2622' may process the received detection signals to transfer them to the controller 2624. In this case, the controller 2624 may process the detection signal to determine a position of the stylus pen 10.

In the above step (S200), it has been described that the first driver/receiver 2620' simultaneously applies the tracking signal to all of the first touch electrodes 111-1 to 111-*m*, but in step S200, the first driver/receiver 2620' may apply the tracking signal to at least one of the first touch electrodes 111-1 to 111-*m*, the second driver/receiver 2622' may apply the tracking signal to at least one of the second touch electrodes 121-1 to 121-*n*, the first driver/receiver 2620' and the second driver/receiver 2622' may simultaneously apply the tracking signal to at least one of the first touch electrodes 111-1 to 111-*m* and at least one of the second touch electrodes 121-1 to 121-*n*, the second driver/receiver 2622' may simultaneously apply the tracking signal to all of the second touch electrodes 121-1 to 121-*n*, or the first driver/receiver 2620' and the second driver/receiver 2622' may simultaneously apply the tracking signal to all of the first touch electrodes 111-1 to 111-*m* and all of the second touch electrodes 121-1 to 121-*n*. When the tracking signals are applied to at least two different touch electrodes, phases of the tracking signals applied to the respective touch electrodes may be equal to each other, or may have a phase difference in consideration of an RC delay of the touch electrode depending on a touch position of the stylus pen 10.

The electronic device 2 outputs and receives a driving signal (S300).

The electronic device 2 may determine a frequency of the driving signal based on the tracking signal received in step S200. The electronic device 2 may determine the frequency of the driving signal by using at least one of a magnitude or a phase of the detection signal received in step S200.

For example, when the magnitude of the detection signal received in step S200 is greater than that of the detection signal received in step S100, the electronic device 2 may determine the frequency of the driving signal closer to the frequency of the tracking signal in step S200 than that of the driving signal in step S100.

For example, when a difference between the phases of the detection signal received in step S200 and the detection signal received in step S100 is smaller than a reference phase (e.g., −90°), the electronic device 2 may determine the frequency of the driving signal closer to the frequency of the tracking signal in step S200 than that of the driving signal in step S100.

Next, a driving signal applied within one frame period 1F and a resonance signal of the stylus pen 10 will be described with reference to FIG. 25.

Figure 26:
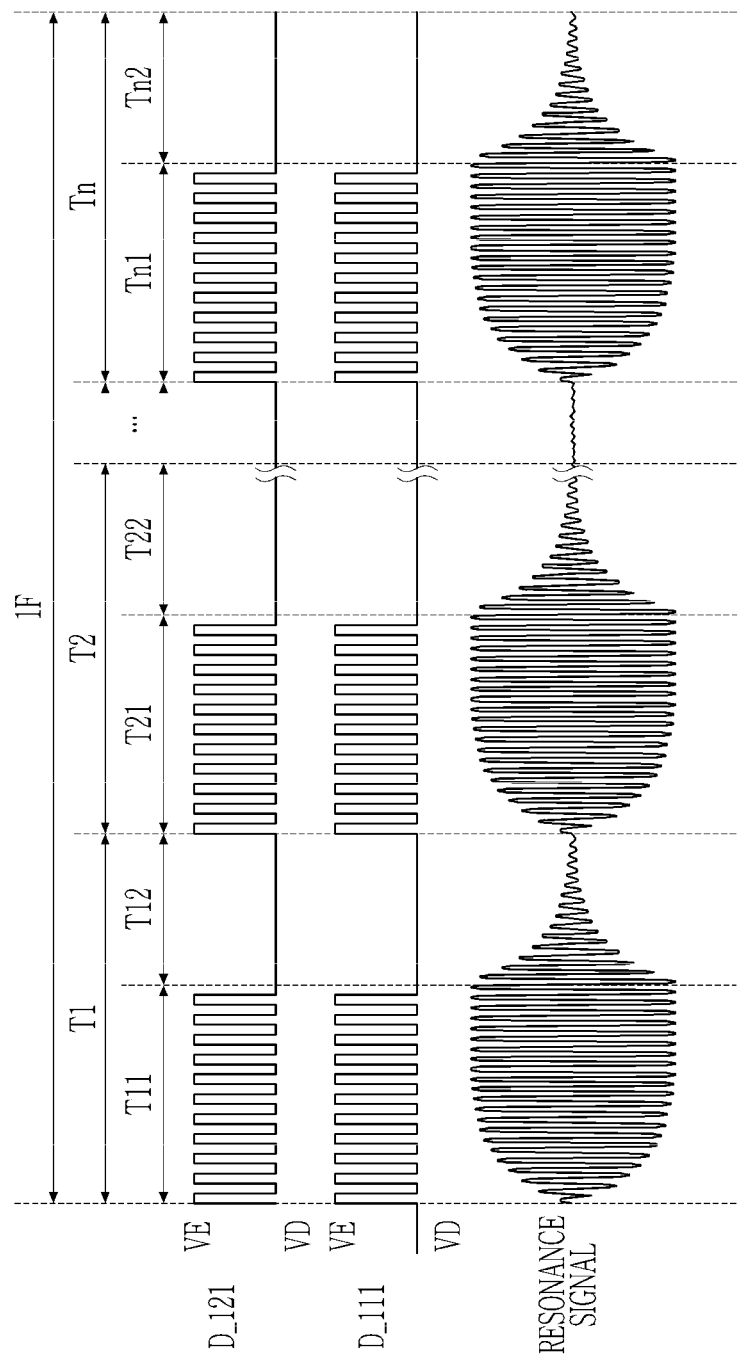
FIG. 26 illustrates a waveform diagram showing an example of a driving signal according to the driving method of FIG. 25.

FIG. 26 illustrates a waveform diagram showing an example of a driving signal according to the driving method of FIG. 25.

A plurality of time periods T1, T2, . . . , and Tn are included in one frame period 1F. A length of one frame period 1F depends on a degree to which the touch controller 102 reports touch data to an external device.

Each of the time periods T1, T2, . . . , and Tn includes first periods T11, T21, . . . , and Tn1 and second periods T12, T22, . . . , and Tn2.

The touch controller 262 applies a driving signal of a first frequency to the touch panel 261 during some of the first periods T11, T21, . . . , and Tn1 within an arbitrary frame period 1F. The touch controller 262 outputs a driving signal (tracking signal) of a second frequency to the touch panel 261 during some other of first periods T11, T21, . . . , and Tn1. Herein, a frame outputting the tracking signal may be repeated every frame. Alternatively, the tracking signal may be outputted only during some of a plurality of frame periods. In this case, some frame periods may be temporally continuous frames or non-consecutive frames.

For example, the first driver/receiver 2620' outputs the driving signal of the first frequency to at least one of the first touch electrodes 111-1 to 111-*m* during some first periods T11 and T21, and applies the driving signal of the second frequency to at least one of the first touch electrodes 111-1 to 111-*m* during some other first period Tn.

A time period for applying the tracking signal to the touch panel 261 during one frame period 1F may be a first period T11 of an initial time period T1 of one frame period 1F, a first period Tn1 of the last time period Tn of one frame period 1F, and at least one time period of the first period of intermediate time periods of one frame period 1F. When a plurality of first sections for applying the tracking signal during one frame period 1F exist within one frame period 1F, the first sections may or may not be continuous in time.

The touch controller 262 may change a frequency of the tracking signal applied to the touch panel 261.

For example, the frequency of the tracking signal may be increased or decreased in units of one frame period 1F or several frame periods. Specifically, when the frequency of the tracking signal that is outputted during a first frame period is 300 kHz, the frequency of the tracking signal that is outputted during a subsequent second frame period may be 303 kHz. Alternatively, when the frequency of the tracking signal outputted during first ten frame periods is 300 kHz, the frequency of the tracking signal outputted during next ten frame periods may be 297 kHz.

As another example, the frequency of the tracking signal may increase or decrease during the time periods T11, T21, . . . , and Tn1 within one frame period 1F. Specifically, when the frequency of the tracking signal outputted during the first section T11 within one frame period 1F is 300 kHz, the frequency of the tracking signal outputted during at least one of the subsequent first sections T21, . . . , and Tn1 may be 303 kHz.

As another example, as time elapses, the touch sensor 260 may increase the frequency of the tracking signal from a lower limit to an upper limit within a predetermined range of a reference frequency (e.g., 300 kHz), or may determine the frequency of the driving signal by decreasing it from the upper limit to the lower limit within the predetermined range of the reference frequency.

As yet another example, the touch sensor 260 may change the frequency of the tracking signal within a first range (e.g., 285 kHz to 315 kHz for 5%) of the reference frequency (e.g., 300 kHz) to determine the frequency of the driving signal, and may determine the frequency of the driving signal by changing the frequency of the tracking signal within a second range (e.g., 270 kHz to 330 kHz for 10%).

As yet another example, the touch sensor 260 may perform a coarse search and then a fine search to determine the frequency of the driving signal. For example, the touch sensor 260 may search the frequency of the driving signal in units of 20 kHz, then may detect the frequency of the drive signal in units of 5 kHz within a 20 kHz range, and then may search the frequency of the drive signal in units of 1 kHz within a 5 kHz range.

Specifically, a frequency range around the reference frequency may be divided into a plurality of first frequency periods in units of a first frequency. One first frequency section may be divided into a plurality of second frequency sections as a unit of a second frequency.

The touch sensor 260 selects and outputs at least one frequency in each of the first frequency sections as the frequency of the tracking signal outputted during each of the first sections, and then determines at least one first frequency section based on a correspondingly received detection signal. The touch sensor 260 may select and output at least one frequency in each of the second frequency sections within the determined at least one first frequency section as the frequency of the tracking signal outputted during each of the first sections, and then may determine the frequency of the driving signal based on the correspondingly received detection signal.

For example, the frequency range (270 kHz to 330 kHz) around a reference frequency (300 kHz) is divided by a first frequency unit (2 kHz). Then, the frequency range around the reference frequency is divided into 30 first frequency sections. In addition, one first frequency section (2 kHz) is divided by a second frequency unit (200 Hz). Then, one first frequency section (2 kHz) is divided into ten second frequency sections.

It is assumed that one frame includes 10 first sections (e.g., T11, T21, . . . , and T101). Then, the tracking signal in a frequency range of 270 kHz to 290 kHz may be outputted for 10 first sections in the first frame. In this case, frequencies of the tracking signals outputted during each first section may be different from each other. During the first first section of the first frame, a tracking signal of an arbitrary frequency (e.g., 271 kHz) that is selected within a range of 270 kHz or more and less than 272 kHz is outputted, and a corresponding detection signal is received. During the second first section of the first frame, a tracking signal of an arbitrary frequency (e.g., 272.8 kHz) that is selected within a range of 272 kHz or more and less than 274 kHz is outputted, and a corresponding detection signal is received. The touch sensor 260 may receive a detection signal by changing the frequency of the tracking signal during the other first sections, and may also output a tracking signal in the frequency range of 290 kHz to 330 kHz for a total of 20 first sections within the second and third frames after the first frame, and detection signals corresponding thereto are received. The touch sensor 260 determines at least one first frequency section based on at least one of a magnitude (amplitude) or a phase of a detection signal obtained in each first section corresponding to each of the 30 first frequency sections. In the above, it has been described that the frequency of the driving signal applied in each first section sequentially increases, but the frequency of the driving signal may sequentially decrease, or may increase or decrease in response to the increase or decrease of the detection signal (e.g., when the frequency is increased compared to the first first section, but the magnitude of the detection signal is decreased, the control is performed in a direction to decrease the frequency), but the present disclosure is not limited to the above description. In the above, the tracking signal is changed and outputted during first sections within one frame, but the tracking signal may be changed and outputted during first sections within a plurality of frames, and the present disclosure is not limited to the above description.

It is assumed that the first frequency section in the range of 272 kHz or more and less than 274 kHz is determined. The tracking signal of the first frequency section of the range of 272 kHz or more and less than 274 kHz during ten first sections in the subsequent fourth frame is outputted, and in this case, frequencies of the tracking signal outputted during each first section may be different from each other. During the first first section, a tracking signal of an arbitrary frequency (e.g., 272.0 kHz) that is selected within a range of 272 kHz or more and less than 272.2 kHz is outputted, and a corresponding detection signal is received. During the second first section of the first frame, a tracking signal of an arbitrary frequency (e.g., 272.2 kHz) that is selected within a range of 272.2 kHz or more and less than 272.4 kHz is outputted, and a corresponding detection signal is received. The touch sensor 260 may receive the detection signal by changing the frequency of the tracking signal in the other first sections. The touch sensor 260 determines the frequency of the driving signal based on at least one of an amplitude or a phase of a detection signal obtained corresponding to each of the ten first frequency sections.

The touch sensor 260 may further include a memory storing profiles for frequency curves in which an X-axis is the frequency value of the driving signal and a Y-axis is the magnitude of the received detection signal. In this case, the touch sensor 260 may output a tracking signal corresponding to at least two first frequency sections, and may predict a frequency value corresponding to a maximum value of the detection signal by using magnitudes of the received detection signals (or a difference in magnitude of the detection signals or an inclination on an XY plane), and may determine the frequency of the driving signal by changing the frequency of the tracking signal within a predetermined frequency section including the corresponding frequency value.

In addition, the profiles stored in the memory correspond to frequency curves having different shapes depending on temperature, humidity, and the like. In this case, the touch sensor 260 may receive information related to temperature, humidity, etc. from an external device (e.g., a host 270 of FIG. 26), and may read a profile for a corresponding frequency curve from the memory based on the information. The electronic device 2 determines the frequency of the driving signal by using the signal that is detected during at least one frame period, and outputs the driving signal.

For example, the touch sensor 260 may determine the frequency of the driving signal outputted during a next frame period by using the signal detected during one frame period. Specifically, when the magnitude of the signal detected to correspond to the tracking signal having the frequency of 303 kHz during the first frame period is greater than that of the signal detected to correspond to the driving signal having the frequency of 300 kHz, the touch sensor 260 may output a driving signal having a frequency of 303 kHz during the second frame period. In this case, the frequency of the tracking signal outputted by the electronic device 2 during the second frame period may be the same as or different from that of the tracking signal outputted during the first frame period.

As another example, the touch sensor 260 may determine a frequency of a driving signal outputted during a next plurality of frame periods by using the signal detected during the frame periods. Specifically, when an average magnitude of signals detected to correspond to tracking signals having a frequency of 303 kHz outputted during the first ten frame periods is greater than that of signals detected to correspond to driving signals having a frequency of 300 kHz outputted during the first ten frame periods, the touch sensor 260 may output a driving signal having a frequency of 303 kHz during next ten frame periods. Alternatively, it is possible to determine the frequency of the driving signal during the next ten frame periods by gradually increasing the frequency of the tracking signal during each of the ten frame periods and considering all the magnitudes of signals received during each frame period.

In addition, a period for applying the tracking signal, a frequency of the tracking signal, and a method for determining the driving signal may be changed in various ways, and the present disclosure is not limited to the above description.

Next, touch data reported by the touch sensor 260 to an external device will be described with reference to FIG. 26 and FIG. 27.

Figure 27:
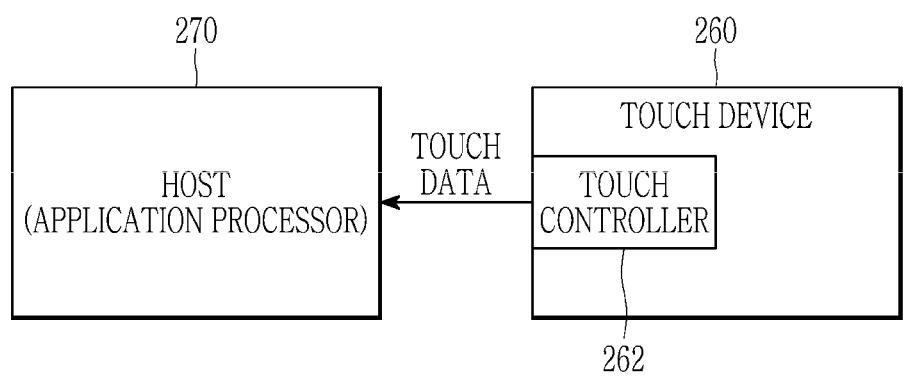
FIG. 27 illustrates a block diagram showing a touch sensor and a host.
Figure 28:
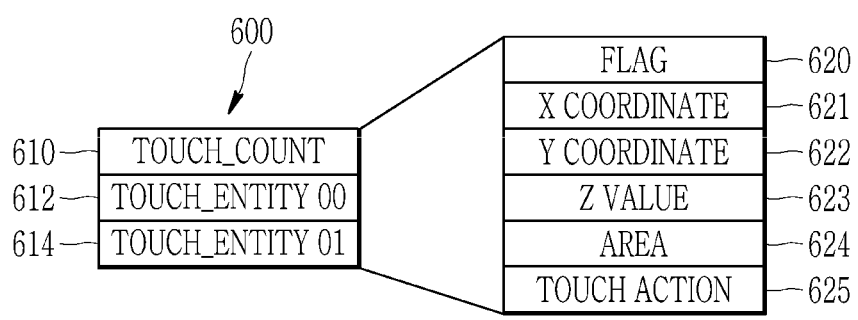
FIG. 28 illustrates an example of touch data provided to a host from a touch sensor.

FIG. 26 illustrates a block diagram of a touch sensor and a host according to the present disclosure, and FIG. 27 illustrates an example of touch data provided to a host from a touch sensor.

Referring to FIG. 26, a host 270 may receive touch data from the touch controller 262 included in the touch sensor 260. For example, the host 270 may be a mobile system-on-chip (SoC), an application processor (AP), a media processor, a microprocessor, a central processing unit (CPU), or a device similar thereto.

After one frame ends, the touch sensor 260 may generate information related to the touch input period 1F during one frame as touch data to transfer it to the host 270.

Alternatively, whenever each time period T1, T2, . . . , and Tn ends, the touch sensor 260 may also generate information related to a touch input during each time period T1, T2, . . . , and Tn as touch data to transfer it to the host 270.

In addition, the touch sensor 260 may perform the driving method according to FIG. 20 or the driving method according to FIG. 24 at a predetermined time interval. For example, the touch sensor 260 may perform the driving method according to FIG. 20 or the driving method according to FIG. 24 at an interval of three hours, one day, or the like.

Alternatively, when there is a touch input after a predetermined time has elapsed from the last touch input to the touch sensor 260, the touch sensor 260 may perform the driving method according to FIG. 20 or the driving method according to FIG. 24.

Alternatively, when receiving a request from the host 270 or information indicating a specific state from the host 270, the touch sensor 260 may perform the driving method according to FIG. 20 or the driving method according to FIG. 24.

For example, when a change in a surrounding environment is detected through an environmental sensor (e.g., a barometer, a hygrometer, a thermometer, a heat sensor, etc.) connected to the host 270, the host 270 requests the touch sensor 260 to perform the driving method according to FIG. 20 or the driving method according to FIG. 24. In this case, the host 270 may transmit a value obtained from the environment sensor to the touch sensor 260 together.

As another example, when the host 270 transmits a value obtained from the environment sensor to the touch sensor 260, the touch sensor 260 may start performing the driving method according to FIG. 20 or the driving method according to FIG. 24 based on the value obtained from the environment sensor.

In this case, the touch sensor 260 may change a frequency of the tracking signal by using a temperature, humidity, etc. sensed by the environmental sensor.

For example, when a current ambient temperature is greater than or equal to a first threshold, the touch sensor 260 may perform section change in a direction in which the frequency of the tracking signal increases from a section including a lowest frequency among a plurality of frequency sections in which a frequency range around the reference frequency is divided by a predetermined frequency unit, to change the frequency of the tracking signal. For example, when the current ambient temperature is smaller than a second threshold (first threshold>second threshold), the touch sensor 260 may perform section change in a direction in which the frequency of the tracking signal decreases from a section including a highest frequency among the frequency sections in which the frequency range around the reference frequency is divided by the predetermined frequency unit, to change the frequency of the tracking signal.

Alternatively, when the current ambient temperature is a value between a third threshold and a fourth threshold (first threshold>third threshold>fourth threshold>second threshold), the touch sensor 260 may perform section change in a direction in which the frequency of the tracking signal increases or decreases back and forth, from a section including a frequency corresponding to between the third threshold and the fourth threshold among the frequency sections in which the frequency range around the reference frequency is divided by the predetermined frequency unit, to change the frequency of the tracking signal.

The touch sensor 260 may further include a memory, and the memory may store a temperature, humidity, and a frequency section of a tracking signal corresponding to each temperature and humidity condition in the form of a look-up table (LUT). Then, the touch sensor 260 may read the frequency section of the tracking signal corresponding to the temperature and humidity sensed by the environmental sensor from the memory, to change the frequency of the tracking signal within the read frequency section.

In addition, the touch sensor 260 may trigger the driving method of the touch sensor 260 in various ways in order to search for the resonance frequency of the stylus pen 10, but the present disclosure is not limited to the above description.

Referring to FIG. 27, touch data 600 may be transferred from the touch sensor 260 to the host 270, and may include a touch count field 610 and one or more touch entity fields 612 and 614.

In the touch count field 610, a value indicating a number of touches that are inputted during one frame period may be written. For example, when touch coordinates of one finger are calculated during the first period T1 in one frame period, and when touch coordinates of one stylus pen are calculated during the first subperiod T21, a value indicating that two touches are inputted is written in the touch count field 61.

The touch entity fields 612 and 614 include fields indicating information related to each touch input. For example, the touch entity fields 612 and 614 may include a flag field 620, an X-axis coordinate field 621, a Y-axis coordinate field 622, a Z-value field 623, an area field 624, and a touch action field 625.

A number of the touch entity fields 612 and 614 may be equal to a value written in the touch count field 61.

A value representing a touch object may be written in the flag field 620. For example, a finger, a palm, and a stylus pen may be filled in the flag field 620 with different values. Values representing the calculated touch coordinates may be written in the X-axis coordinate field 621 and the Y-axis coordinate field 622. A value corresponding to the signal strength of the detection signal may be written in the Z-value field 623. A value corresponding to an area of the touched area may be written in the area field 624.

According to embodiments, the host apparatus 270 receiving touch data 600 determines that a touch object is the finger when the touch area is larger than the threshold by using the value of the area field 624, and determines that the touch object is the stylus pen 10 when the touch area is less than or equal to the threshold.

According to the embodiments, the host apparatus 270 receiving the touch data 600 may identify whether the touch object is the finger or the stylus pen 10 by using the value of the flag field 620.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

The invention claimed is:

1. An electronic device comprising:
   a touch sensor configured to sequentially transfer an electromagnetic signal having two or more frequencies to a stylus pen, and to receive an electromagnetic signal corresponding to the electromagnetic signal from the stylus pen; and
   a touch controller configured to operate the touch sensor by determining one of the two or more frequencies as the frequency of the electromagnetic signal depending on a change in the received electromagnetic signal,
   wherein the touch sensor is further configured to sequentially apply electromagnetic signals each having a frequency included in each of a plurality of first frequency sections divided by a first frequency unit during each of a plurality of time periods within a first period, and sequentially applies electromagnetic signals each having a frequency included in each of a plurality of second frequency sections divided by a second frequency unit to each of a plurality of time periods within a second period that is successive to the first period, and wherein the first frequency unit is greater than the second frequency unit.

2. The electronic device of claim 1, wherein
the touch controller determines a frequency at which a magnitude of the received electromagnetic signal is large as the frequency of the electromagnetic signal.

3. The electronic device of claim 1, wherein
the touch controller generates touch data based on the received electromagnetic signal in units of one period.

4. The electronic device of claim 1, wherein
a first frequency section including a frequency having a largest magnitude among electromagnetic signals received during a first period is divided in the second frequency unit.

5. The electronic device of claim 1, wherein
the touch sensor
includes: a touch panel configured to include a plurality of first touch electrodes for detecting touch coordinates in a first direction and a plurality of second touch electrodes for detecting touch coordinates in a second direction crossing the first direction; and
a driver/receiver configured to apply driving signals corresponding to the two or more frequencies to at least one of the first touch electrodes and the second touch electrodes to allow the electromagnetic signal having the two or more frequencies to be transferred to the stylus pen, and to receive the electromagnetic signal from the stylus pen.

6. The electronic device of claim 1, wherein
the touch sensor
includes: a touch panel configured to include a loop coil for generating a magnetic field, a touch panel configured to include a plurality of first touch electrodes for detecting touch coordinates in a first direction, and a plurality of second touch electrodes for detecting touch coordinates in a second direction crossing the first direction; and
a driver/receiver configured to apply driving signals corresponding to the two or more frequencies to the loop coil to allow the electromagnetic signal having the two or more frequencies to be transferred to the stylus pen, and to receive the electromagnetic signal from the stylus pen.

7. An electronic device comprising:
a touch sensor configured to sequentially transfer an electromagnetic signal having two or more frequencies to a stylus pen, and to receive an electromagnetic signal corresponding to the electromagnetic signal from the stylus pen;
a touch controller configured to operate the touch sensor by determining one of the two or more frequencies as the frequency of the electromagnetic signal depending on a change in the received electromagnetic signal; and
temperature sensor configured to sense an ambient temperature,
wherein the touch sensor starts transmitting the electromagnetic signal having the two or more frequencies when the ambient temperature is changed.

8. A control method of an electronic device, comprising:
sequentially transmitting, by a touch sensor, an electromagnetic signal having two or more frequencies to a stylus pen; and
determining, by a touch controller, one of the two or more frequencies as the frequency of the electromagnetic signal depending on a change in the received electromagnetic signal to operate the touch sensor,
wherein the sequentially transmitting of the electromagnetic signal having the two or more frequencies to the stylus pen includes:
sequentially applying, by the touch sensor, electromagnetic signals each having a frequency included in each of a plurality of first frequency sections divided by a first frequency unit during each of a plurality of time periods within a first period; and
sequentially applying, by the touch sensor, electromagnetic signals each having a frequency included in each of a plurality of second frequency sections divided by a second frequency unit to each of a plurality of time periods within a second period that is successive to the first period, and
wherein the first frequency unit is greater than the second frequency unit.

9. The control method of claim 8, wherein
the determining of one of the two or more frequencies as the frequency of the electromagnetic signal
includes determining, by the touch controller, a frequency at which a magnitude of the received electromagnetic signal is large as the frequency of the electromagnetic signal.

10. The control method of claim 8, further comprising
generating, by the touch controller, touch data based on the received electromagnetic signal in units of one period.

11. The control method of claim 8, wherein
a first frequency section including a frequency having a largest magnitude among electromagnetic signals received during the first period is divided in the second frequency unit.

12. A control method of an electronic device, comprising:
sequentially transmitting, by a touch sensor, an electromagnetic signal having two or more frequencies to a stylus pen;
determining, by a touch controller, one of the two or more frequencies as the frequency of the electromagnetic signal depending on a change in the received electromagnetic signal to operate the touch sensor; and
sensing an ambient temperature,
wherein transmitting of the electromagnetic signal having the two or more frequencies is started when the ambient temperature is changed.

13. A system comprising:
a stylus pen configured to include a resonance circuit having a resonance frequency; and
a touch sensor configured to search for the resonance frequency by increasing a frequency of a driving signal from a lower limit to an upper limit within a predetermined range of a reference frequency or decreasing the frequency of the driving signal from the upper limit to the lower limit within the predetermined range, and to transfer an electromagnetic signal having the resonance frequency to the stylus pen,
wherein the touch sensor is further configured to sequentially apply electromagnetic signals each having a frequency included in each of a plurality of first frequency sections divided by a first frequency unit during each of a plurality of time periods within a first period, and sequentially applies electromagnetic signals each having a frequency included in each of a plurality of second frequency sections divided by a second frequency unit to each of a plurality of time periods within a second period that is successive to the first period, and wherein the first frequency unit is greater than the second frequency unit.

* * * * *